(12) United States Patent
Mori

(10) Patent No.: US 10,355,794 B2
(45) Date of Patent: Jul. 16, 2019

(54) CHANNEL SIMULATION DEVICE AND CHANNEL SIMULATION PROGRAM

(71) Applicant: TOA CORPORATION, Hyogo-ken (JP)

(72) Inventor: Katsuhiro Mori, Kobe (JP)

(73) Assignee: TOA CORPORATION, Hyogo-ken (JP)

( * ) Notice: Subject to any disclaimer, the term of this patent is extended or adjusted under 35 U.S.C. 154(b) by 0 days.

(21) Appl. No.: 15/574,402

(22) PCT Filed: May 22, 2015

(86) PCT No.: PCT/JP2015/064782
§ 371 (c)(1),
(2) Date: Nov. 15, 2017

(87) PCT Pub. No.: WO2016/189587
PCT Pub. Date: Dec. 1, 2016

(65) Prior Publication Data
US 2018/0138997 A1    May 17, 2018

(51) Int. Cl.
*H04B 17/391*     (2015.01)
*H04L 5/00*       (2006.01)
(Continued)

(52) U.S. Cl.
CPC .......... *H04B 17/3912* (2015.01); *H04B 1/04* (2013.01); *H04B 17/391* (2015.01);
(Continued)

(58) Field of Classification Search
CPC ....... H04W 16/14; H04B 1/04; H04B 17/391; H04B 17/3912; H04L 5/0037; H04L 5/0062
See application file for complete search history.

(56) References Cited

U.S. PATENT DOCUMENTS 5,214,615 A * 5/1993 Bauer .................... G06F 3/011
                                                        367/128
2009/0135672 A1* 5/2009 Matsuura .............. G01S 3/8083
                                                        367/100
2011/0103626 A1* 5/2011 Bisgaard ................ H04R 3/005
                                                        381/313
(Continued)

FOREIGN PATENT DOCUMENTS

JP     H1093449 A    4/1998
JP     2003244008 A  8/2003
(Continued)

OTHER PUBLICATIONS

Translation of International Preliminary Report on Patentability corresponding to PCT/JP2015/064782, dated Nov. 28, 2017, 4 pages.
(Continued)

*Primary Examiner* — Dominic E Rego
(74) *Attorney, Agent, or Firm* — Kilpatrick Townsend & Stockton LLP

(57) ABSTRACT

This channel simulation device is provided with a memory for storing a distance calculation parameter and reception strength calculation parameter, and a processor for estimating desired-wave reception strength and interfering-wave reception strength on the basis of the distance calculation parameter and the reception strength calculation parameter. The desired-wave reception strength refers, for each set of two areas selected from a plurality of areas, to reception strength when a transmission signal transmitted from the wireless microphone of one area is received by a receiver in the one area. The interfering-wave reception strength refers to reception strength when a transmission signal transmitted from the wireless microphone of the other area is received by the receiver in the one area.

14 Claims, 19 Drawing Sheets

(51) Int. Cl.
*H04B 1/04* (2006.01)
*H04W 16/14* (2009.01)

(52) U.S. Cl.
CPC .......... *H04L 5/0037* (2013.01); *H04L 5/0062* (2013.01); *H04W 16/14* (2013.01)

(56) References Cited

U.S. PATENT DOCUMENTS

| | | | | |
|---|---|---|---|---|
| 2011/0206229 | A1* | 8/2011 | Yataka | H04R 3/005 381/375 |
| 2012/0197637 | A1* | 8/2012 | Gratke | G10L 21/02 704/226 |
| 2013/0093831 | A1* | 4/2013 | Cutler | H04N 7/142 348/14.01 |
| 2013/0136273 | A1* | 5/2013 | Marash | H04R 3/005 381/92 |
| 2013/0155816 | A1* | 6/2013 | Li | G06F 3/0418 367/127 |
| 2014/0045515 | A1* | 2/2014 | Austin | H04W 4/04 455/456.1 |
| 2014/0185842 | A1* | 7/2014 | Kang | H04R 5/02 381/303 |
| 2014/0198618 | A1* | 7/2014 | Cary | G01B 17/00 367/99 |
| 2014/0358532 | A1* | 12/2014 | Lin | H04S 7/305 704/226 |
| 2015/0189454 | A1* | 7/2015 | Anderson | H04R 25/652 381/328 |
| 2015/0284062 | A1* | 10/2015 | Brodin | B63C 11/26 701/468 |
| 2018/0070185 | A1* | 3/2018 | Pedersen | H04R 25/505 |

FOREIGN PATENT DOCUMENTS

| | | | |
|---|---|---|---|
| JP | 2012119939 | A | 6/2012 |
| JP | 2012191415 | A | 10/2012 |

OTHER PUBLICATIONS

International Search Report corresponding to PCT/JP2015/064782, dated May 22, 2015, 1 page.

* cited by examiner

Fig.18

|  | Area A1 | Area A2 | Area A3 |
|---|---|---|---|
| Area A1 | D1:OOdB<br>D2:OOdB<br>⋮<br>D729:OOdB | U1:OOdB<br>U2:OOdB<br>⋮<br>U729:OOdB | U1:OOdB<br>U2:OOdB<br>⋮<br>U729:OOdB |
| Area A2 | U1:OOdB<br>U2:OOdB<br>⋮<br>U729:OOdB | D1:OOdB<br>D2:OOdB<br>⋮<br>D729:OOdB | U1:OOdB<br>U2:OOdB<br>⋮<br>U729:OOdB |
| Area A3 | U1:OOdB<br>U2:OOdB<br>⋮<br>U729:OOdB | U1:OOdB<br>U2:OOdB<br>⋮<br>U729:OOdB | D1:OOdB<br>D2:OOdB<br>⋮<br>D729:OOdB |

Fig.28

|    | Ra | Rb | Rc | Rd | Re |
|----|----|----|----|----|----|
| Ra |    | ×  | ×  | ×  | ×  |
| Rb |    |    | ×  | ×  | ○  |
| Rc |    |    |    | ×  | ×  |
| Rd |    |    |    |    | ×  |
| Re |    |    |    |    |    |

Fig.29

|    | Ra | Rb | Rc | Rd | Re |
|----|----|----|----|----|----|
| Ra |    | D/U: ○○dB | D/U: ○○dB | D/U: ○○dB | D/U: ○○dB |
| Rb |    |    | D/U: ○○dB | D/U: ○○dB | D/U: ○○dB |
| Rc |    |    |    | D/U: ○○dB | D/U: ○○dB |
| Rd |    |    |    |    | D/U: ○○dB |
| Re |    |    |    |    |    |

Fig.30

| Frequency (MHz) | Group | | | | | |
|---|---|---|---|---|---|---|
| | A | B | C | D | E | F |
| 806.125 | | | | | | F1 |
| 806.250 | | | | D1 | | |
| 806.375 | | B1 | | | | |
| 806.500 | | | | | E1 | |
| 806.625 | | | C1 | | | |
| 806.750 | A1 | | | | | |
| 806.875 | | | | | | F2 |
| 807.000 | | | | D2 | | |
| 807.125 | | B2 | | | | |
| 807.250 | | | | | E2 | |
| 807.375 | | | C2 | | | |
| 807.500 | A2 | | | | | |
| 807.625 | | | | | | F3 |
| 807.750 | | | | D3 | | |
| 807.875 | | B3 | | | | |
| 808.000 | | | | | E3 | |
| 808.125 | | | C3 | | | |
| 808.250 | A3 | | | | | |
| 808.375 | | | | | | F4 |
| 808.500 | | | | D4 | | |
| 808.625 | | B4 | | | | |
| 808.750 | | | | | E4 | |
| 808.875 | | | C4 | | | |
| 809.000 | A4 | | | | | |
| 809.125 | | | | | | F5 |
| 809.250 | | | | D5 | | |
| 809.375 | | B5 | | | | |
| 809.500 | | | | | E5 | |
| 809.625 | | | C5 | | | |
| 809.750 | A5 | | | | | |

Fig.31

|     | Assignment number /Desired number | State | Channel | |
|-----|-----------------------------------|-------|---------|---|
| Ra  | 10/10 | Full | F1, D1, B1, E1, C1, A1, F2, D2, B2, E2 | ←62 |
| Rb  | 5/5   | Full | C2, A2, F3, D3, B3 | |
| Rc  | 9/9   | Full | E3, C3, A3, F4, D4, B4, E4, C4, A4 | |
| Rd  | 6/6   | Full | F5, D5, B5, E5, C5, A5 | |
| Re  | 3/3   | Full | C2, A2, F3 | |

Fig.32

|     | Assignment number /Desired number | State | Channel | |
|-----|-----------------------------------|-------|---------|---|
| Ra  | 10/10 | Full | F1, D1, B1, E1, C1, A1, F2, D2, B2, E2 | ←62 |
| Rb  | 5/5   | Full | C2, A2, F3, D3, B3 | |
| Rc  | 9/9   | Full | E3, C3, A3, F4, D4, B4, E4, C4, A4 | |
| Rd  | 6/6   | Full | F5, D5, B5, E5, C5, A5 | |
| Re  | 0/7   | Not full | - | |

Fig.33

|     | Assignment number /Desired number | State | Channel | |
|-----|-----------------------------------|-------|---------|---|
| Ra  | 10/10 | Full | F1, D1, B1, E1, C1, A1, F2, D2, B2, E2 | ←62 |
| Rb  | 5/5   | Full | C2, A2, F3, D3, B3 | |
| Rc  | 9/9   | Full | E3, C3, A3, F4, D4, B4, E4, C4, A4 | |
| Rd  | 4/6   | Not full | F5, D5, B5, E5 | |
| Re  | 7/7   | Full | C2, A2, F3, D3, B3, C5, A5 | |

Fig.34

| | Assignment number /Desired number | State | Channel |
|---|---|---|---|
| Ra | 4/4 | Full | F1, E1, F2, E2 |
| Rb | 4/4 | Full | F3, E3, F4, E4 |
| Rc | 1/1 | Full | F5 |
| Rd | 1/1 | Full | E5 |
| Re | 3/3 | Full | F3, E3, F4 |

Fig.35

| | Assignment number /Desired number | State | Channel |
|---|---|---|---|
| Ra | 4/4 | Full | F1, E1, F2, E2 |
| Rb | 2/2 | Full | F3, E3 |
| Rc | 3/3 | Full | F4, E4, F5 |
| Rd | 0/2 | Not full | - |
| Re | 0/4 | Not full | - |

Fig.36

| | Assignment number /Desired number | State | Channel |
|---|---|---|---|
| Ra | 4/4 | Full | F1, E1, F2, E2 |
| Rb | 2/2 | Full | F3, E3 |
| Rc | 3/3 | Full | F4, E4, F5 |
| Rd | 1/2 | Not full | E5 |
| Re | 2/4 | Not full | F3, E3 |

Fig.37

| | Assignment number /Desired number | State | Channel |
|---|---|---|---|
| Ra | 4/4 | Full | F4, E4, F5, E5 |
| Rb | 2/2 | Full | F2, E2 |
| Rc | 0/3 | Not full | - |
| Rd | 2/2 | Full | F1, E1 |
| Re | 4/4 | Full | F2, E2, F3, E3 |

CHANNEL SIMULATION DEVICE AND CHANNEL SIMULATION PROGRAM

CROSS-REFERENCE TO RELATED APPLICATIONS

This application is a continuation application of International Application No. PCT/JP2015/064782, filed on May 22, 2015, the entire contents of which are incorporated herein by reference.

TECHNICAL FIELD

The present invention relates to a channel simulation device and a channel simulation program for wireless microphones.

BACKGROUND ART

There are techniques for automatically assigning channels to multiple wireless microphones arranged in the same area (see Patent Document 1, for example). In these techniques, unused channel information is shared between a master unit and slave units of a receiver.

Patent Document 1: Japanese Laid-Open Patent Publication No. 2003-244008

SUMMARY OF THE INVENTION

In the case of using multiple wireless microphones in each of multiple areas, the same channel or an interference-prone channel may be used in different areas in order to increase the number of wireless microphones used. However, in the case of using the same channel or an interference-prone channel in different areas, it is not easy to assign an appropriate channel to each wireless microphone in each area without interference or with substantially no interference.

Particularly, under the condition that the number of rooms (areas) is large, it is difficult to set each wireless microphone to an appropriate channel. For this reason, operations for assigning channels to multiple wireless microphones have conventionally been performed by a skilled engineer based on his/her experience in practice.

The present invention has been made in view of the circumstances above, and an object of the present invention is to provide a channel simulation device and a channel simulation program capable of generating a channel plan for wireless microphones.

(1) A channel simulation device that solves the above-described problem includes a memory configured to store at least one distance calculation parameter for calculating distances between multiple wireless microphones and a receiver in multiple areas in which the multiple wireless microphones and the receiver are used, and at least one reception strength calculation parameter for estimating reception strengths when transmission signals transmitted from the wireless microphones are received by the receiver, and a processor configured to estimate, for each set of two areas selected from the multiple areas, a desired-wave reception strength when a transmission signal transmitted from a wireless microphone in one area of the two areas is received by the receiver in the one area and an interference-wave reception strength when a transmission signal transmitted from a wireless microphone in the other area of the two areas is received by the receiver in the one area, based on the distance calculation parameter and the reception strength calculation parameter.

In accordance with the channel simulation device above, the desired-wave reception strength and the interference-wave reception strength can be obtained and thereby the strength difference between the desired-wave reception strength and the interference-wave reception strength can be obtained for each set of two areas selected from the multiple areas. It is therefore possible to generate a channel plan for the wireless microphones without relying on a skilled engineer.

(2) In the channel simulation device, the processor is configured to perform a channel determination, for each set of two areas selected from the multiple areas, as to whether or not interference occurs between the two areas based on the difference between the desired-wave reception strength and the interference-wave reception strength. The difference between the desired-wave reception strength and the interference-wave reception strength here means the logarithmic difference therebetween if the desired-wave reception strength and the interference-wave reception strength are in a logarithmic form. This difference therefore means the ratio between the desired-wave reception strength and the interference-wave reception strength. In accordance with this configuration, it is possible to obtain information on whether or not interference occurs between the two areas and therefore it is possible to generate a channel plan for the wireless microphones with which the wireless microphones are less likely to interfere with each other while increasing the number of usable channels.

(3) In the channel simulation device described above, the memory is configured to store a group of channels set at a predetermined frequency interval, and the processor is configured to select one or more channels that can be assigned to one or more areas from the group of channels based on the channel determination. In accordance with this configuration, a user can find the channel(s) that can be assigned to one or more areas.

(4) The channel simulation device described above further includes an input device through which a user input operation is received, the memory is configured to store a group of channels set at a predetermined frequency interval and number information which is input through an input operation received at the input device and indicates the number of wireless microphones set in each of the multiple areas, and the processor is configured to select channels that can be assigned to the areas based on the channel determination and the number information. In accordance with this configuration, the channels that can be assigned to the multiple areas are selected in view of the number of wireless microphones set in the areas.

(5) The channel simulation device described above further includes an input device through which a user input operation is received, the memory is configured to store a group of channels set at a predetermined frequency interval, and the processor is configured to, when the input device receives a selection operation for selecting a channel from the group of channels, determine whether or not the selected channel can be assigned to any one of the areas based on the channel determination. In accordance with this configuration, the user can understand whether or not the channel that the user has selected can be assigned to any one of the multiple areas.

(6) The channel simulation device described above further includes an input device through which a user input operation is received, the memory is configured to store a group of channels set at a predetermined frequency interval, and the processor is configured to, when the input device receives a first selection operation for selecting a channel from the group of channels and a second selection operation for selecting an area from the multiple areas, determine whether or not the selected channel can be assigned to the selected area based on the channel determination. In accordance with this configuration, the user can understand whether or not the channel that the user has selected can be assigned to the area that the user has selected.

(7) In the channel simulation device described above, the memory is configured to store, as the reception strength calculation parameter, a propagation loss parameter for deriving reception strength according to the distance between the wireless microphone and the receiver. In accordance with this configuration, it is possible to calculate the reception strength when the receiver receives a transmission signal easily based on the reception strength calculation parameter and the distance between the wireless microphone and the receiver.

(8) In the channel simulation device described above, the memory is configured to store, as the reception strength calculation parameter, an obstacle parameter indicating attenuation amount of the signal strength of the transmission signal to be attenuated when the transmission signal passes through an obstacle. In accordance with this configuration, in the case of estimating the reception strength when the receiver receives a transmission signal from the wireless microphone, if there is an obstacle between the wireless microphone and the receiver, it is possible to calculate the attenuation amount of the signal strength of the transmission signal by the obstacle easily.

(9) In the channel simulation device described above, the memory is configured to store the obstacle parameter that is set individually for each obstacle material. In accordance with this configuration, the attenuation amount of the transmission signal from the wireless microphone is calculated based on the material of the obstacle. Accordingly, the attenuation amount of the transmission signal from the wireless microphone is less likely to differ significantly between the calculated attenuation amount and the actual attenuation amount.

(10) The channel simulation device described above further includes an input device through which a user input operation is received, the processor is configured to output a layout image showing the layout of a building on a display device, receive an obstacle specifying operation for specifying the range or arrangement of obstacles arranged between multiple areas or within an area in the output layout image, and store an obstacle arrangement parameter indicating the range or arrangement of the obstacles based on the range or arrangement specified by the obstacle specifying operation as the reception strength calculation parameter in the memory. In accordance with this configuration, since the obstacle arrangement parameter is derived based on an operation on the layout image of the building, the user can set the obstacle arrangement parameter easily.

(11) The channel simulation device described above further includes an input device through which a user input operation is received, the processor is configured to output a layout image showing the layout of a building, receive a specifying operation for specifying the range or arrangement of the multiple areas within the output image, and store the distance calculation parameter based on the range or arrangement specified by the specifying operation in the memory. In accordance with this configuration, since the distance calculation parameter is derived based on an operation on the layout image of the building, the user can set the distance calculation parameter easily.

(12) In the channel simulation device described above, the processor is configured to, when estimating the desired-wave reception strength, estimate the reception strength when a transmission signal transmitted from the wireless microphone in the one area is received by the receiver for each of multiple arrangement points at which the receiver is expected to be installed in the one area, use one selected from the multiple estimated reception strengths according to a rule as the desired-wave reception strength, when estimating the interference-wave reception strength, estimate the reception strength when a transmission signal transmitted from the wireless microphone in the other area is received by the receiver for each of multiple arrangement points at which the receiver is expected to be installed in the one area, and use one selected from the multiple estimated reception strengths according to a rule as the interference-wave reception strength.

The desired-wave reception strength and the interference-wave reception strength can be estimated with the areas regarded as points in a space. In this case, the desired-wave reception strength is set to a constant, while the interference-wave reception strength is calculated based on the distance between two points. In accordance with this calculation, the ratio between the desired-wave reception strength and the interference-wave reception strength is determined according to only the arrangement relationship between the areas regardless of the size of the areas. However, since the larger the areas, the greater the maximum distance between the wireless microphone and the receiver becomes in practice, the range (from minimum value to maximum value) of the desired-wave reception strength and the range (from minimum value to maximum value) of the interference-wave reception strength also increase.

In the configuration above, any one of the multiple reception strengths estimated within an area is selected as the desired-wave reception strength. Any one of the multiple reception strengths estimated between areas is selected as the interference-wave reception strength. The desired-wave reception strength and the interference-wave reception strength are thus selected from several candidates according to a predetermined rule. Optimizing the predetermined rule allows the desired-wave reception strength and the interference-wave reception strength to be adjusted to approach an actual value.

(13) In the channel simulation device, the processor is configured to, when estimating the desired-wave reception strength, estimate the reception strength when a transmission signal transmitted from the wireless microphone in the one area is received by the receiver for each of multiple arrangement points at which the wireless microphones are expected to be used in the one area, use one selected from the multiple estimated reception strengths according to a rule as the desired-wave reception strength, when estimating the interference-wave reception strength, estimate the reception strength when a transmission signal transmitted from the wireless microphone in the other area is received by the receiver for each of multiple arrangement points at which the wireless microphones are expected to be used in the one area, and use one selected from the multiple estimated reception strengths according to a rule as the interference-wave reception strength. Also with this configuration, for the same reason as in (12) above, optimizing the predetermined rule allows the desired-wave reception strength and the interference-wave reception strength to be adjusted to approach an actual value.

(14) A channel simulation program includes computer-readable instructions that cause a computer to perform a first processing for reading out of a memory at least one distance calculation parameter for calculating distances between multiple wireless microphones and a receiver in multiple areas in which the multiple wireless microphones and the receiver are used and at least one reception strength calculation parameter for estimating reception strengths when transmission signals transmitted from the wireless microphones are received by the receiver and to perform a second processing for estimating, for each set of two areas selected from the multiple areas, a desired-wave reception strength when a transmission signal transmitted from a wireless microphone in one area of the two areas is received by the receiver in the one area and an interference-wave reception strength when a transmission signal transmitted from a wireless microphone in the other area is received by the receiver in the one area, based on the distance calculation parameter and the reception strength calculation parameter.

In accordance with the channel simulation program above, the desired-wave reception strength and the interference-wave reception strength can be obtained and thereby the strength difference between the desired-wave reception strength and the interference-wave reception strength can be obtained for each set of two areas selected from the multiple areas. It is therefore possible, by using the channel simulation program, to generate a channel plan for the wireless microphones without relying on a skilled engineer.

In accordance with the channel simulation device and the channel simulation program above, the desired-wave reception strength and the interference-wave reception strength can be obtained and thereby the strength difference therebetween can be obtained. It is therefore possible to generate a channel plan for the wireless microphones without relying on a skilled engineer.

Other aspects and advantages of the embodiments will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 18 is a table showing the desired-wave reception strength within each area and the interference-wave reception strength between the areas.

FIG. 28 is a table showing an aspect of the results of interference determination processing.

FIG. 29 is a table showing another aspect of the results of interference determination processing.

FIG. 30 is a table showing the relationship between channels and groups.

FIG. 31 is a table showing an example channel plan.

FIG. 32 is a table showing another example channel plan.

FIG. 33 is a table showing another example channel plan.

FIG. 34 is a table showing another example channel plan.

FIG. 35 is a table showing another example channel plan.

FIG. 36 is a table showing another example channel plan.

FIG. 37 is a table showing another example channel plan.

DESCRIPTION OF THE EMBODIMENTS

Figure 1:
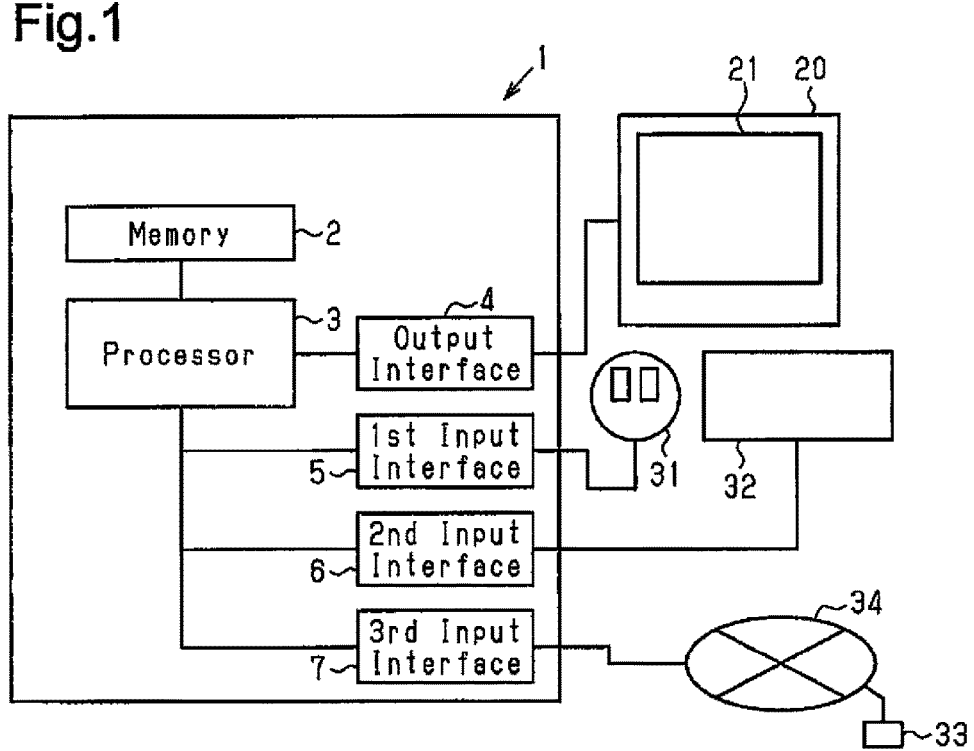
FIG. 1 is a block diagram of a channel simulation device.

A channel simulation device according to an embodiment will be described with reference to FIGS. 1 to 41.

When one or more wireless microphones 45 are used in each of multiple areas 41 (see FIG. 4), the channel simulation device 1 is used to assign channels to the wireless microphones 45 in each area 41. In this embodiment, it is assumed that at least one receiver 46 is installed in each area 41.

The case where the wireless microphones 45 are used in each of the multiple areas 41 means, for example, the case where the wireless microphones 45 are used in a building having multiple venues (one example of the areas 41) and/or meeting rooms (one example of the areas 41). In such a situation, the multiple wireless microphones 45 are used simultaneously. If the number of wireless microphones 45 used becomes large, it is necessary to assign the same channel to different ones of the wireless microphones 45, and in this case, interference may occur. It is therefore necessary to assign an appropriate channel to each wireless microphone 45. Particularly, when there are multiple areas 41 within the wireless communication range which is used by a wireless microphone 45, the receiver 46 in one of the areas 41 may receive a transmission signal from the wireless microphone 45 used in the other area 41. Therefore, it is necessary to assign an appropriate channel to each area 41 so that no such interference occurs. It will be apparent to those skilled in the art from the present disclosure that the areas 41 are not intended to be limited to rooms surrounded by a wall. The areas 41 are set arbitrarily by a user. For example, there are cases where an entire playground may be set as an area 41 or the playground may be divided into two regions and each region may be set as an individual area 41.

As shown in FIG. 1, the channel simulation device 1 has a memory 2 configured to store information on a building in which the wireless microphones 45 are used and a processor 3 configured to assign a channel to each of the wireless microphones 45.

The channel simulation device 1 preferably further includes a display device 20 and an input/output interface (I/O IF). For example, the channel simulation device 1 includes an output interface 4 to which the display device 20 is connected, a first input interface 5 to which a first input device 31 is connected, a second input interface 6 to which a second input device 32 is connected, and a third input interface 7 to which a third input device 33 is connected.

The first input device 31 is a pointing device such as a mouse. The first input device 31 is used to operate the pointer on a display screen 21 of the display device 20. The first input device 31 is configured to output a pointer command indicating information such as the position and the amount of movement of the pointer.

The second input device 32 is a typing device such as a keyboard and used to input numerical and character information. The second input device 32 is configured to output a numerical value specifying signal indicating a numerical value and a character specifying signal corresponding to a character.

The third input device 33 is a device used to capture a layout image 40a of a building, such as an electronic camera, a scanner, a copier, or an electronic medium reading device for accessing an electronic medium (CD-R, SD memory card). The third input device 33 is configured to output image data indicating image information. It will be apparent to those skilled in the art from the present disclosure that the third input device 33 is connected to the channel simulation device 1 directly or via a communication network 34.

The display device 20 is a user interface of the channel simulation device 1. The display device 20 is configured to receive various types of display signals output from the channel simulation device 1 and, based on the display signals, display images corresponding to the display signals on the display screen 21. For example, the display device 20 is configured to receive a signal used to display an image of the layout 40 of the building on the display device 20, a signal used to display a scaler 50 to be described hereinafter on the display device 20, a pointer display signal used to display the pointer on the display device 20, a signal used to display an icon, a signal used to display a channel table 61, a signal used to display a channel plan 62, for example. Images corresponding to these signals are then displayed on the display screen 21.

Figure 2:
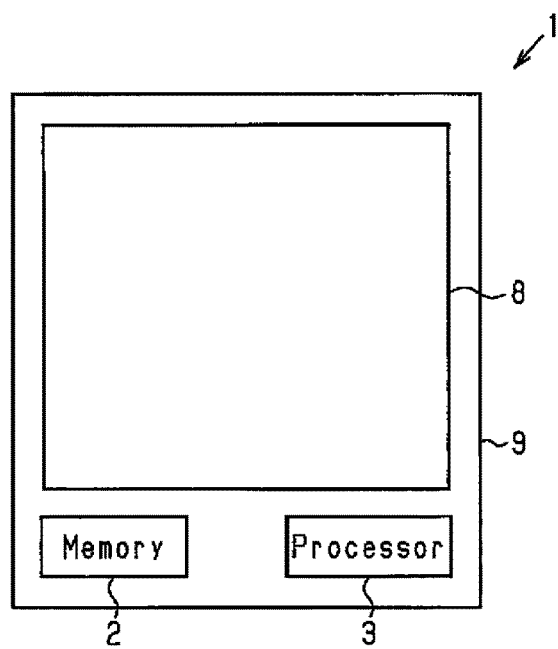
FIG. 2 is a schematic view of a channel simulation device according to another embodiment.

It will be apparent to those skilled in the art from the present disclosure that as shown in FIG. 2, the first input device 31, the second input device 32, and the display device 20 can be integrated. For example, a display device 8 with a touchscreen can be used as an alternative to the first input device 31, the second input device 32, and the display device 20. The display device 8 with a touchscreen can be configured as part of a case 9 of the channel simulation device 1. Such a tablet-type channel simulation device 1 can be utilized conveniently to prepare a channel plan 62 (see FIG. 31, for example) at a building site.

The memory 2 is configured to store at least a distance calculation parameter and a reception strength calculation parameter.

The distance calculation parameter is used to calculate, in a space including multiple areas 41 in which the multiple wireless microphones 45 and the receiver 46 are used, the distances between the wireless microphones 45 and the receiver 46 within each area 41 or between the areas 41. The distance calculation parameter is used in calculating the desired-wave reception strength and the interference-wave reception strength. In a certain embodiment, the distance calculation parameter is a coordinate parameter indicating the arrangement of the wireless microphones 45 in a predetermined coordinate space, a coordinate parameter indicating the arrangement of the receiver 46 in a predetermined coordinate space, for example.

The reception strength calculation parameter is used to estimate the reception strength when a transmission signal transmitted from the wireless microphone 45 is received by the receiver 46.

The reception strength calculation parameter includes at least one of a propagation loss parameter, a directivity parameter, an obstacle parameter, and an obstacle arrangement parameter.

The propagation loss parameter is used to derive the reception strength according to the distance between each wireless microphone 45 and the receiver 46. For example, the propagation loss parameter is defined as a value set for each predetermined distance. For example, it is set as the attenuation amount according to each distance, such as "X1" for a distance equal to or more than 1 meter and less than 2 meters, "X2" for a distance equal to or more than 2 meters and less than 3 meters, and "X3" for a distance equal to or more than 3 meters and less than 4 meters. The reception strength is then estimated based on the initial value of each transmission signal and the propagation loss parameter. It will be apparent to those skilled in the art from the present disclosure that the reception strength can also be estimated with another method. The reception strength can be estimated using a calculating formula having the distance between each wireless microphone 45 and the receiver 46 and the initial value of each transmission signal (e.g. a quadratic formula or an exponential, the distance as variable). The calculating formula is used to calculate the reception strength when a transmission signal transmitted from each wireless microphone 45 is received by the receiver 46 in a free space with no obstacle. In the case of using such a calculating formula, the propagation loss parameter is defined as a coefficient or a constant for the variable (distance) in the calculating formula.

The propagation loss parameter is used to calculate the attenuation amount of the signal strength of a transmission signal associated with space propagation in both cases when the antenna of the receiver 46 is omnidirectional and directional.

The directivity parameter is used if the receiver 46 has a directional antenna.

If the receiver 46 has a directional antenna, the reception strength of a transmission signal received along the directivity of the receiver 46 is equal to the reception strength in the case where the receiver 46 has an omnidirectional antenna and receives a transmission signal (hereinafter referred to as "comparative case" in the description of the directivity parameter). On the other hand, the reception strength of a transmission signal received in a direction other than the directivity of the receiver 46 is lower than the reception strength in the comparative case. If the receiver 46 is thus directional, the reception strength varies depending on the direction of reception of the transmission signal, so that the memory 2 stores the directivity parameter.

For example, the directivity parameter is defined as follows. The directivity parameter indicates the attenuation amount of the reception strength at the angle of reception of a transmission signal by the directional receiver 46 (hereinafter referred to as "reception angle"). The reception angle is defined as zero degrees when the directional receiver 46 receives a transmission signal along the directivity. The attenuation amount of the reception strength indicates the attenuation amount of the reception strength at a predetermined reception angle with respect to the reception strength at a reception angle of 0 degrees (in dB). In order to simplify the calculation, the directivity parameter is defined as "0" if the reception angle is within a predetermined angular range (e.g. 0±α degrees), while as a predetermined value if the reception angle is other than the predetermined angle. Alternatively, the directivity parameter is defined for each reception angle to calculate the reception strength accurately.

The obstacle parameter indicates the attenuation amount of the signal strength of a transmission signal attenuated when the transmission signal passes through an obstacle. The obstacle indicates an object positioned between the wireless microphones 45 and the receiver 46. The obstacle is, for example, a partition wall 43. The attenuation amount of a transmission signal varies depending on the material of the obstacle. The obstacle parameter is therefore set for each member (concrete material, iron material, glass material, for example) of the obstacle. In another example, the obstacle parameter includes an obstacle attenuation parameter and an obstacle arrangement parameter. The obstacle attenuation parameter indicates the attenuation amount of the signal strength of a transmission signal from each wireless microphone 45 when passing through an obstacle a unit distance only (in dB). The memory 2 is configured to store an obstacle attenuation parameter corresponding to each of the materials constituting the obstacle.

The obstacle arrangement parameter is defined as a range parameter indicating the size, shape, and position of the obstacle or a coordinate parameter indicating the arrangement of the obstacle in each area 41. If the obstacle has a predefined shape, the coordinate of the obstacle is used as the obstacle arrangement parameter. The attenuation amount of the signal strength of a transmission signal from each wireless microphone 45 when passing through the obstacle is calculated based on the obstacle attenuation parameter and the obstacle arrangement parameter.

The memory 2 is also configured to store the layout 40 of the building including the areas 41 in which the wireless microphones 45 are used (see FIG. 3) and a desired number (number information) for the wireless microphones 45 set for each area 41. The desired number for the wireless microphones 45 indicates the number of wireless microphones 45 desired by the user and used in each area 41. The layout 40 is layout information that the channel simulation device 1 uses to calculate the desired-wave reception strength and the interference-wave reception strength to be described hereinafter. The layout 40 includes information such as the size of the areas 41 in the building, the arrangement relationship between the areas 41, and the position, size, and material of an obstacle (radio wave attenuator such as partition wall 43) existing within each area 41 or between the areas 41.

An example of the layout 40 of the building to be stored in the memory 2 will be described with reference to FIGS. 3 and 4.

Figure 3A:
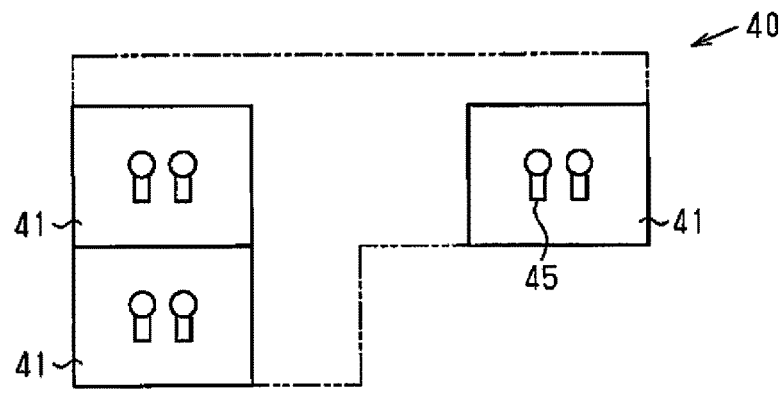
FIGS. 3A, 3B and 3C show examples of the layout of the first floor, the second floor and the third floor of a building, respectively.
Figure 3B:
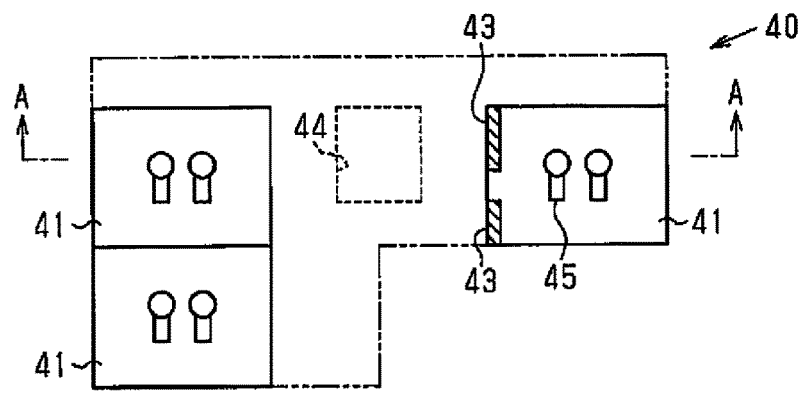
Figure 3C:
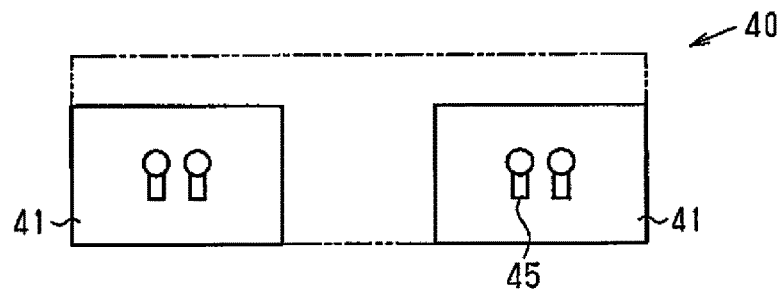
Figure 4:
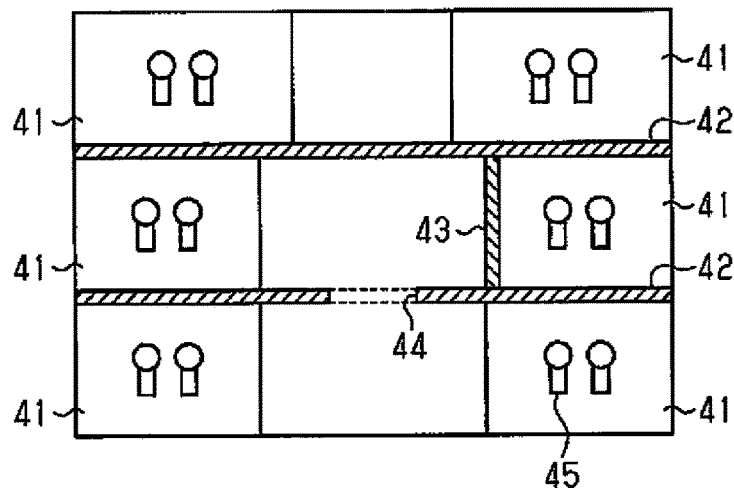
FIG. 4 is a cross-sectional view of the building taken along the line A-A in FIG. 3.

The building shown in FIG. 3 is three-story. FIGS. 3A, 3B, and 30 show the layout 40 of the first floor, the second floor, and the third floor, respectively. FIG. 4 is a cross-sectional view of the building taken along the line A-A in FIG. 3B. In FIG. 3B, a void 44 is indicated by broken lines. The rooms (areas 41) in which the wireless microphones 45 are used are indicated by the solid lines. Floor walls 42 (see FIG. 4) and partition walls 43 (see FIG. 3B) provided at each floor are indicated by diagonal hatching. The outline of each floor is indicated by the alternate long and two short dashed line.

The memory 2 is configured to store the number of floors (stories) of the building, the height of each floor, the size of the areas 41 at each floor, and the position of the areas 41 at each floor. In a certain embodiment, the memory 2 is configured to store the coordinate of vertices forming each area 41. It will be apparent to those skilled in the art from the present disclosure that the areas 41 each indicate a site in which at least one wireless microphone 45 and at least one receiver 46 are arranged. A room in which no wireless microphone 45 is arranged is not stored as an area 41.

As obstacle information, the memory 2 is configured to store, for example, a state where the floors are partitioned by concrete floor walls 42 as floor information. Such floor information is stored in the memory 2 because the concrete floor walls 42 constitute a factor of attenuating a transmission signal from each wireless microphone 45 and serve as an important parameter in estimating the interference-wave reception strength in each area 41 and, in common building structures, the floors are partitioned by concrete floor walls 42. In other instances, pillars and partitions, for example, arranged at each floor can be obstacles.

The memory 2 is also preferably configured to store the position and size of, for example, the partition walls 43 installed at each floor and the void 44 formed through multiple floors, for example. The memory 2 is further preferably configured to store the material of the partition walls 43.

The partition walls 43 installed at each floor constitute a factor of attenuating the strength of a transmission signal from each wireless microphone 45. The void 44, if provided through floors, reduces the effect of blocking a transmission signal by the floors that are formed by the concrete floor walls 42. For this reason, the position and size of the partition walls 43 installed at each floor and the void 44 are stored in the memory 2.

The degree of attenuation of a transmission signal from each wireless microphone 45 varies depending on the material of the partition walls 43. For example, iron attenuates a transmission signal more significantly than concrete. Glass is less likely to attenuate a transmission signal than concrete. For this reason, the material of the partition walls 43 is stored in the memory 2.

(Outline)

Figure 5:
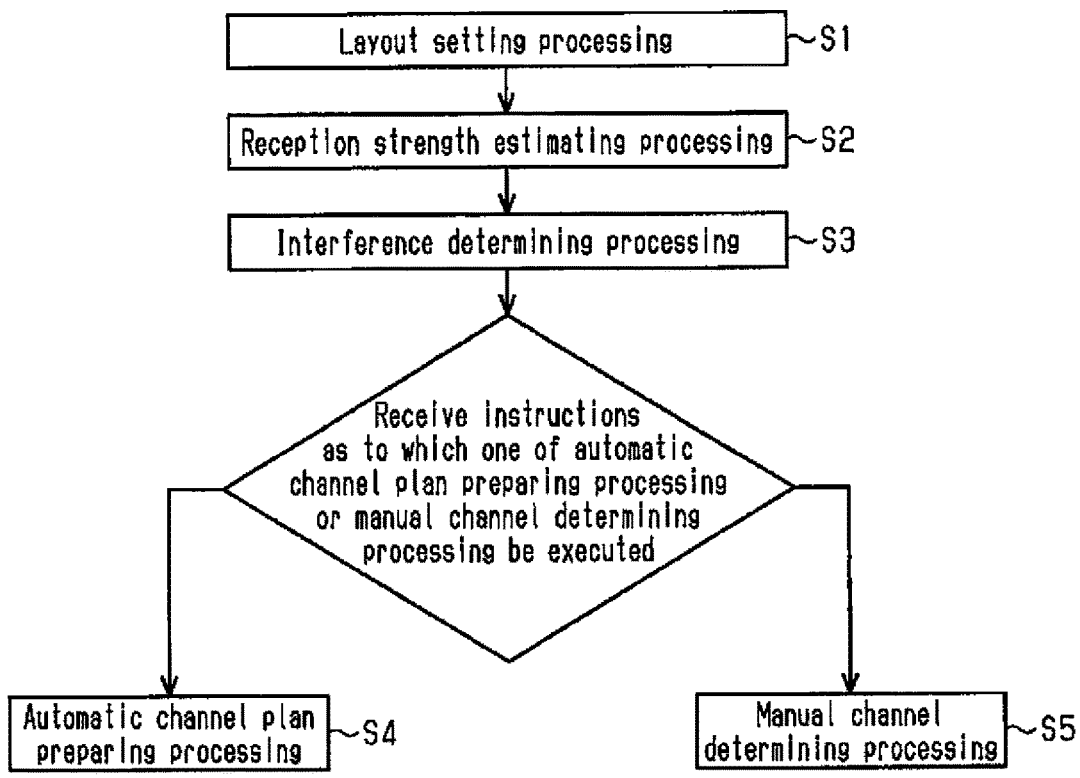
FIG. 5 shows the relationship between processes in the channel simulation device.

An operation of the processor 3 will be described with reference to FIG. 5.

The processor 3 performs processing for setting the layout 40 based on a user operation (hereinafter referred to as "layout setting processing S1"). The processor 3 also performs processing for estimating the desired-wave reception strength and the interference-wave reception strength based on the layout information on the layout 40, the propagation loss parameter, the directivity parameter, the obstacle parameter, and the obstacle arrangement parameter (hereinafter referred to as "reception strength estimating processing S2"). The processor 3 also performs processing for determining whether or not interference occurs between the areas 41 based on the results of the reception strength estimating processing S2 (hereinafter referred to as "interference determining processing"). The processor 3 also performs processing for automatically assigning a channel to each of the wireless microphones 45 in each area 41 and recommending a channel plan therefor based on the results of the interference determining processing S3 (hereinafter referred to as "automatic channel plan preparing processing S4"). The processor 3 also performs processing for determining whether or not it is possible to assign a channel to each of the wireless microphones 45 in each area 41 based on the results of the interference determining processing S3 (hereinafter referred to as "manual channel determining processing S5"). It will be apparent to those skilled in the art from the present disclosure that the user selects whether to perform the automatic channel plan preparing processing S4 or to perform the manual channel determining processing S5. The processor 3 performs the automatic channel plan preparing processing S4 or the manual channel determining processing S5 on the basis of a signal from the input device based on a selective operation by the user.

The desired-wave reception strength indicates the reception strength when the receiver 46 receives a desired wave, that is, a transmission signal to be received. In a certain embodiment, the desired-wave reception strength indicates the reception strength for two areas 41 selected from the multiple areas 41 when a transmission signal transmitted from the wireless microphone 45 that is arranged within the area 41 of interest (one area 41) is received by the receiver 46 within the area 41 (the one area 41).

The interference-wave reception strength indicates the reception strength when the receiver 46 receives an interference-wave, that is, a transmission signal not to be received. In a certain embodiment, the interference-wave reception strength indicates the reception strength for two areas 41 selected from the multiple areas 41 when a transmission signal transmitted from the wireless microphone 45 that is arranged within the area 41 outside of interest (the other area 41) is received by the receiver 46 within the area 41 of interest (the one area 41).

(S1: Layout Setting Processing)

The generation of the layout 40 will be described with reference to FIGS. 6 to 15.

The layout setting processing S1 is used to set a parameter for performing the reception strength estimating processing S2.

The processor 3 generates the layout 40 for calculating the desired-wave reception strength and the interference-wave reception strength based on externally input layout information. The generation of the layout 40 will hereinafter be described.

The processor 3 has various types of modes for constructing the layout 40. In each mode, the processor 3 displays various types of tools (e.g. scaler 50, first input frame 51, second input frame 52, for example) on the display screen 21 of the display device 20 to acquire predetermined information required to construct the layout 40 and goes into a stand-by state to wait for an input.

Figure 6:
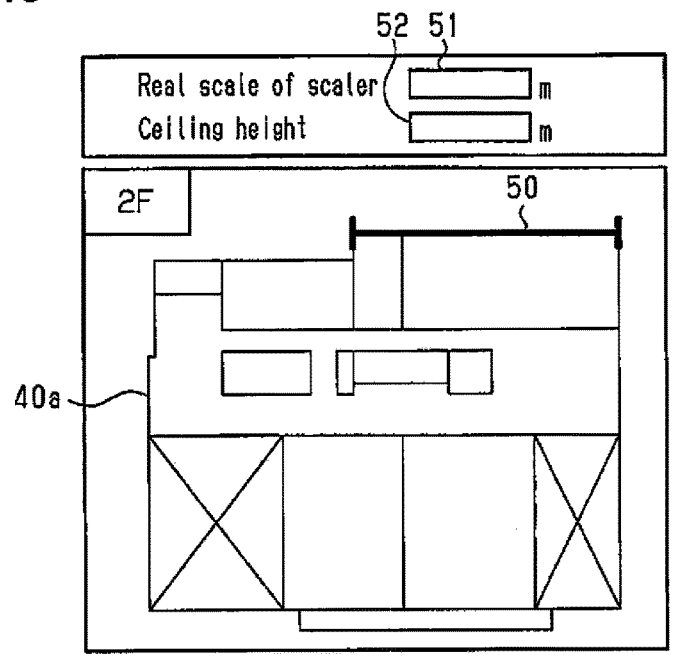
FIG. 6 is an image view of a screen used to set the dimensions of the layout.

As shown in FIG. 6, the processor 3 outputs a display signal for an externally input layout image 40a (e.g. image of the plan view of each floor of the building) to the output interface 4 and thereby displays the layout image 40a on the display screen 21 of the display device 20. At this time, the processor 3 outputs not only the display signal for the layout image 40a, but also a display signal for the scaler 50, a display signal for the first input frame 51 into which the real scale of the scaler 50 is input, and a display signal for the second input frame 52 into which the ceiling height is input. The scaler 50 is stretchable through the first input device 31 (mouse, for example) and configured such that it can be arranged along a predetermined portion of the layout image 40a. For example, the processor 3 outputs a display signal for displaying the scaler 50 and then, when receiving a pointer command output by the first input device 31, generates and outputs a new display signal for displaying the scaler 50. The scaler 50 is thus displayed stretchably or movably on the display screen 21 of the display device 20.

A numerical value can be input through the second input device 32 into the first input frame 51. A numerical value specifying signal output from the second input device 32 through such an input operation is received by the second input interface 6. The processor 3 causes the memory 2 to store the value input in the first input frame 51 as a length of the scaler 50 based on the numerical value specifying signal received via the second input interface 6. The processor 3 also causes the memory 2 to store the value input in the second input frame 52 as a ceiling height. This causes the processor 3 to make the correlation between the layout image 40a and the real scale.

Figure 7:
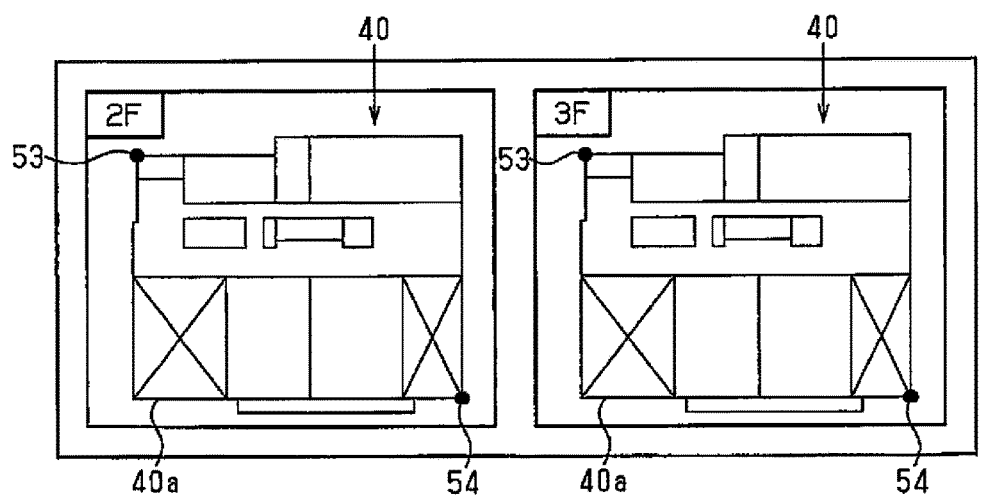
FIG. 7 is an image view of a screen used to set the arrangement relationship of the layout of each floor.

FIG. 7 is an image view used for association of the arrangement relationship of each floor.

In a mode for setting the arrangement relationship of the layout image 40a between different floors, the processor 3 outputs two layout images 40a on the display screen 21 of the display device 20 and outputs a set of first and second positioning pointers 53 and 54 for each layout image 40a. The first and second positioning pointers 53 and 54 are used to set the arrangement relationship of the layout 40 between different floors.

The first and second positioning pointers 53 and 54 are movable through the first input device 31 on the display screen 21. For example, when reception of a pointer command output from the first input device 31, the processor 3 outputs through the output interface 4 a pointer display signal for moving the first or second positioning pointers 53 or 54 on the display screen 21 of the display device 20 based on the specified position information included in the pointer command. It will be apparent to those skilled in the art from the present disclosure that in the description below, the layout images 40a corresponding to two respective different floors may be referred to as first layout image 40a and second layout image 40a.

One set of first and second positioning pointers 53 and 54 are arranged on the first layout image 40a.

The other set of first and second positioning pointers 53 and 54 are arranged on the second layout image 40a.

The processor 3 presumes that the first positioning pointer 53 set on the first layout image 40a and the first positioning pointer 53 set on the second layout image 40a have the same XY coordinate (horizontal coordinate) and causes the memory 2 to store the XY coordinate. The processor 3 also presumes that the second positioning pointer 54 set on the first layout image 40a and the second positioning pointer 54 set on the second layout image 40a have the same XY coordinate (horizontal coordinate) and causes the memory 2 to store the XY coordinate. The processor 3 thus makes an association of the arrangement relationship between the first and second layout images 40a and 40a.

Figure 8:
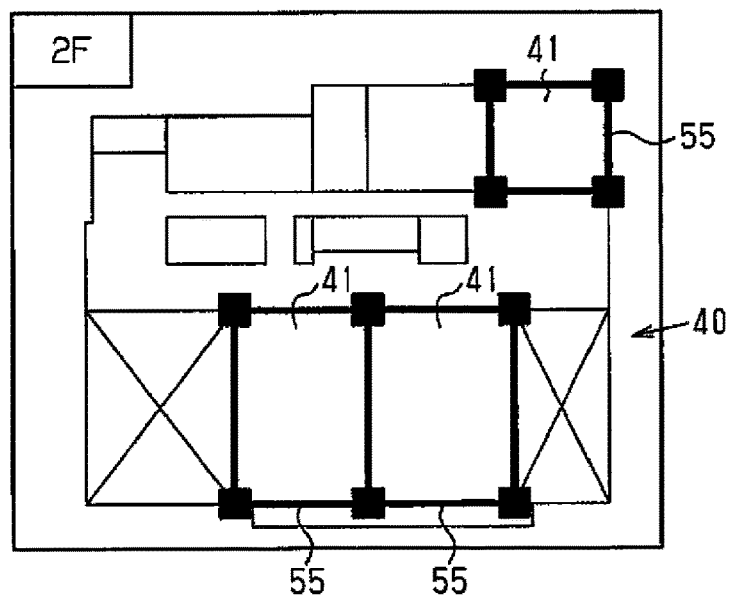
FIG. 8 is an image view of a screen showing the layout with areas set therein.

FIG. 8 is an image view showing a floor with areas 41 set therein.

After transitioning to a mode for specifying areas 41 (area setting mode), the processor 3 outputs a display signal for displaying frames indicating the areas 41 (hereinafter referred to as "area frames 55") on the floor layout image 40a and, based on the display signal, displays the area frames 55 on the display device 20. The area frames 55 are movable and stretchable through the first input device 31 on the display screen 21. The processor 3 causes the memory 2 to store the locations where the area frames 55 are arranged through an operation (specifying operation) on the first input device 31 by the user as areas 41 at the floor together with the names of the areas 41. For example, the processor 3 outputs a display signal for moving or scaling the area frames 55 based on the pointer command output from the first input device 31 in the area setting mode and, based on an input decision command from the first input device 31, causes the memory 2 to store the range of the areas 41 at the floor. It will be apparent to those skilled in the art from the present disclosure that the names of the areas 41 can be input through the second input device 32 via the display screen 21.

Figure 9:
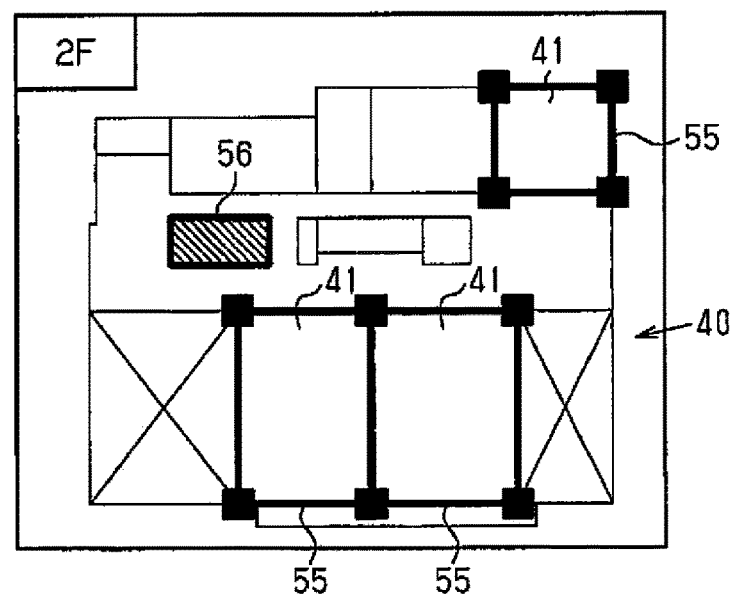
FIG. 9 is an image view of a screen showing the layout with a partition walls set therein.

FIG. 9 is an image view showing a floor with a partition wall 43 set therein.

After transitioning to a mode for specifying a partition wall 43 (partition wall setting mode), the processor 3 outputs a display signal for displaying a frame indicating the partition wall 43 (hereinafter referred to as "partition wall frame 56") on the floor layout image 40a and, based on the display signal, displays the partition wall frame 56 on the display device 20. The partition wall frame 56 is movable and stretchable through the first input device 31 on the display screen 21. The processor 3 causes the memory 2 to store the location where the partition wall frame 56 is arranged through an operation (obstacle specifying operation) on the first input device 31 by the user as a partition wall 43 at the floor together with the name of the partition wall 43. For example, the processor 3 outputs a display signal for moving or scaling the partition wall 43 based on the pointer command output from the first input device 31 in the partition wall setting mode and, based on an input decision command from the first input device 31, causes the memory 2 to store the range at the floor as the range of the partition wall 43. It will be apparent to those skilled in the art from the present disclosure that the name of the partition wall 43 can be input through the second input device 32 via the display screen 21.

Figure 10:
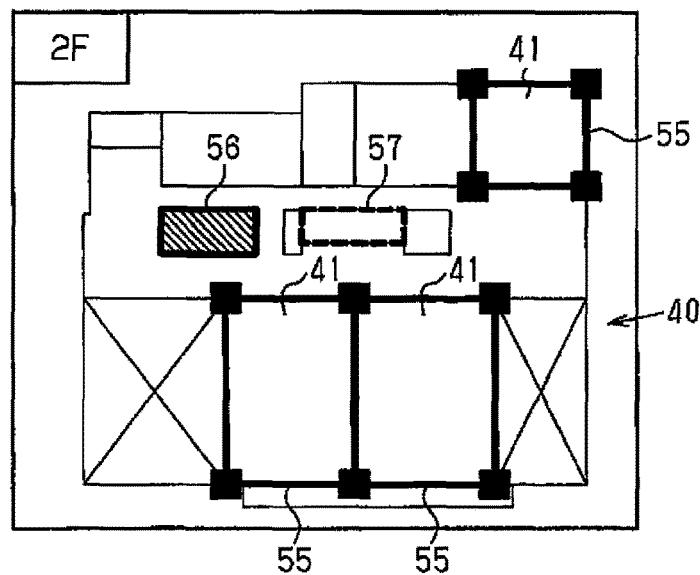
FIG. 10 is an image view of a screen showing the layout with a void set therein.

FIG. 10 is an image view showing areas 41 with a void 44 set therein.

After transitioning to a mode for specifying a void 44 (void setting mode), the processor 3 outputs a display signal for displaying a frame indicating the void 44 (hereinafter referred to as "void frame 57") on the floor layout image 40a and, based on the display signal, displays the void frame 57 on the display device 20. The void frame 57 is movable and stretchable through the first input device 31 on the display screen 21. The processor 3 causes the memory 2 to store the location where the void frame 57 is arranged through the first input device 31 as a void 44 at the floor together with the name of the void 44. For example, the processor 3 outputs a display signal for moving or scaling the void 44 based on the pointer command output from the first input device 31 in the void setting mode and, based on an input decision command from the first input device 31, causes the memory 2 to store the range at the floor as the range of the void 44. It will be apparent to those skilled in the art from the present disclosure that the name of the void 44 can be input through the second input device 32 via the display screen 21.

Figure 11:
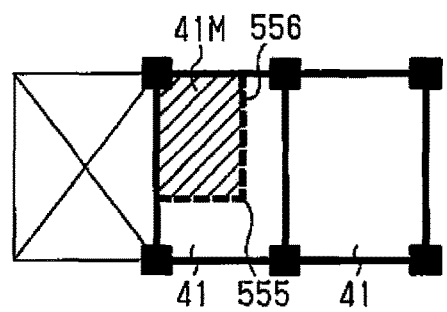
FIG. 11 is an image view of a screen showing the estimated use range of a wireless microphone.

FIG. 11 is an image view showing the estimated use range 41M of a wireless microphone 45 within an area 41.

The processor 3 has a use range setting mode for setting the estimated use range 41M of the wireless microphone 45. In the use range setting mode, the processor 3 causes the memory 2 to store the estimated use range 41M of the wireless microphone 45 for each area 41. This setting is used if it is preliminarily envisaged that the wireless microphone 45 is used in a limited range within the area 41.

For example, if it is envisaged that the wireless microphone 45 is used within a certain height range (e.g. the use range of the wireless microphone 45 is limited within a space between a plane at a predetermined height from the floor and the floor plane), the processor 3 causes the memory 2 to store the height range information based on an input signal from the second input device 32.

For example, if it is also envisaged that the wireless microphone 45 is used within a predetermined range within the area 41 (i.e. within a portion of the room, for example) the processor 3 generates range information based on a user input and causes the memory 2 to store the range information. The processor 3 can receive the range information as a numerical input.

In a certain embodiment, the processor 3 outputs a display signal for displaying an area frame 556 indicating the estimated use range 41M on the floor layout image 40a and, based on the display signal, displays the area frame 556 indicating the estimated use range 41M on the display device 20. The area frame 556 is movable and stretchable through the first input device 31 on the display screen 21. For example, anchors 555 defining the corners of the area frame 556 are configured to be operated through the first input device 31. When the position of the anchors 555 is determined through an operation of the first input device 31 and an input decision command is output from the first input device 31, the processor 3 causes the memory 2 to store the size and position of the area frame 556 as the estimated use range 41M of the wireless microphone 45 based on the reception of the input decision command.

Figure 12:
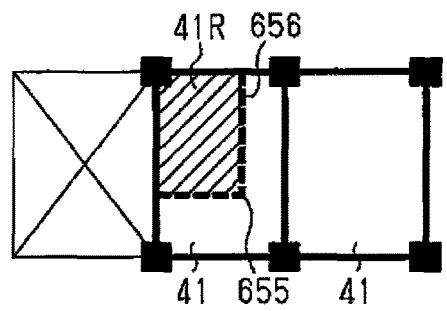
FIG. 12 is an image view of a screen showing the estimated installation range of a receiver.

FIG. 12 is an image view showing the estimated installation range 41R of the receiver 46 within an area 41.

The processor 3 has an installation range setting mode for setting the estimated installation range 41R of the receiver 46. In the installation range setting mode, the processor 3 causes the memory 2 to store the estimated installation range 41R of the receiver 46 for each area 41. This setting is used if it is preliminarily envisaged that the position of arrangement of the receiver 46 (any one of arrangement points PD within the area 41 at which the receiver 46 is arranged; the same also applies hereinafter) is limited within a predetermined rage of the area 41.

For example, if it is envisaged that the receiver 46 is installed within a certain height range (e.g. the installation range of the receiver 46 is limited within a space between the ceiling and a plane at a predetermined distance from the ceiling), the processor 3 causes the memory 2 to store the height range information based on an input signal from the second input device 32.

In a certain embodiment, the processor 3 outputs a display signal for displaying an area frame 656 indicating the estimated installation range 41R on the floor layout image 40a and, based on the display signal, displays the area frame 656 indicating the estimated installation range 41R on the display device 20.

The area frame 656 is movable and stretchable through the first input device 31 on the display screen 21. For example, anchors 655 defining the corners of the area frame 656 are configured to be operated through the first input device 31. When the position of the anchors 655 is determined through an operation of the first input device 31 and an input decision command is output from the first input device 31, the processor 3 causes the memory 2 to store the size and position of the area frame 656 as the estimated installation range 41R of the receiver 46 based on the reception of the input decision command.

Figure 13:
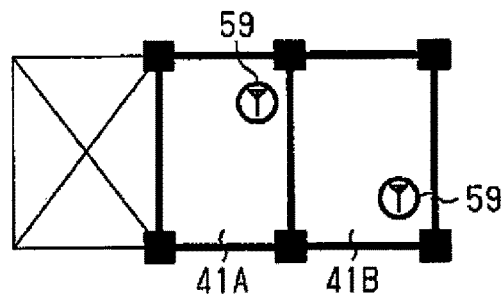
FIG. 13 is an image view of a screen showing the arrangement of receivers.

FIG. 13 is an image view showing areas 41 with receivers 46 arranged at predetermined positions.

Unlike the wireless microphones 45, the user does not usually walk around with a receiver 46 in his/her hand. It is envisaged that the receivers 46 are generally installed permanently on the wall and/or the ceiling. If this is known in advance, it is preferred that the number and arrangement position of receivers 46 be set within the areas 41. In a certain embodiment, the processor 3 outputs a display signal for displaying icons of the receivers 46 (hereinafter referred to as "receiver icons 59") to the display device 20. This allows the user to visually set the number and arrangement position of receivers 46.

Figure 14:
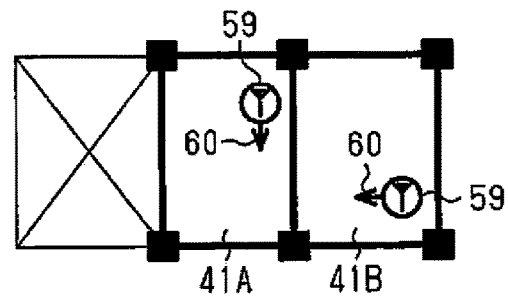
FIG. 14 is an image view of a screen showing the arrangement and directivity of the receivers.

FIG. 14 is an image view showing areas 41 with receivers 46 arranged at predetermined positions and the directivity of the receivers set.

Some of the receivers 46 are directional, while the others are omnidirectional. For this reason, the receivers 46 are each set to be directional or omnidirectional.

In the case of directional receivers 46, it is preferred that with the setting of the directivity, a directivity parameter indicating the orientation of the directivity (hereinafter referred to simply as "directivity") be stored in the memory 2.

The processor 3 outputs a display signal for displaying the directivity of the receivers 46 to the display device 20. The display device 20 displays arrow icons 60 indicating the directivity based on the display signal for displaying the directivity of the receivers 46. The arrow icons 60 can be changed in their directions through the first input device 31. This allows the directivity of the receivers 46 to be set on the display screen 21 of the display device 20. For example, when one of the receivers 46 is selected on the display screen 21, an arrow icon 60 is displayed together with the receiver icon 59. The user can rotate the arrow icon 60. When an input decision command indicating the decision of the direction of the arrow icon 60 is received, the processor 3 then causes the memory 2 to store the orientation of the arrow icon 60 as the directivity of the receiver 46.

Figure 15:
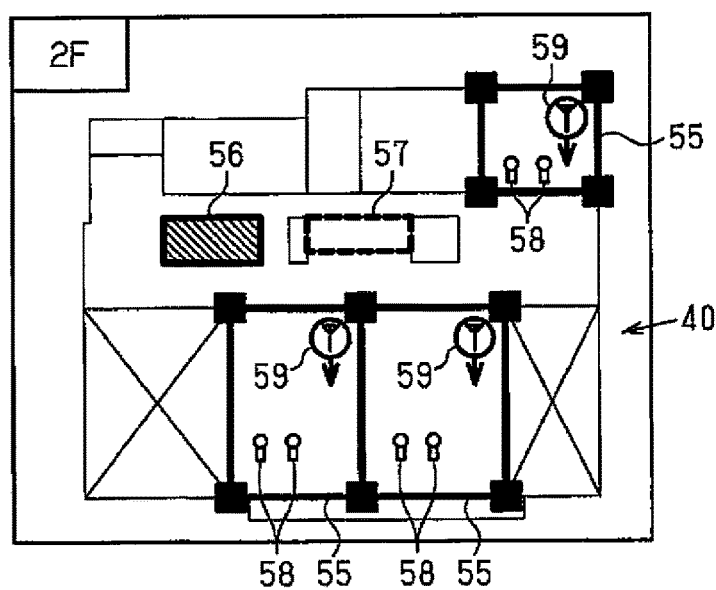
FIG. 15 is an image view of a screen showing the layout with wireless microphones and receivers arranged therein.
Figure 16:
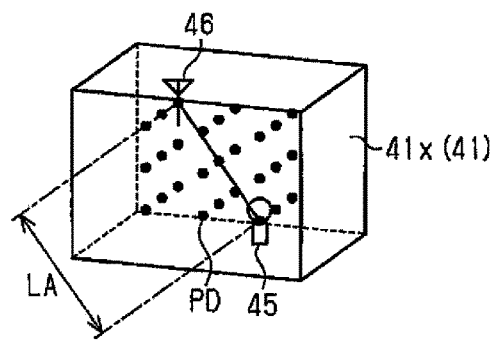
FIG. 16 is a perspective view of an area for illustrating a method for calculating the desired-wave reception strength.

FIG. 15 is an image view showing a floor with a desired number of wireless microphones 45 set and receivers 46 arranged within areas 41.

After transitioning to a mode for specifying the desired number of wireless microphones 45 and the arrangement of the receivers 46 (arrangement mode), the processor 3 outputs a display signal for displaying the wireless microphones 45 and the receivers 46 on the floor layout image 40a and, based on the display signal, displays icons of the wireless microphones 45 (hereinafter referred to as "microphone icons 58") and receiver icons 59 on the display device 20. In a certain embodiment, the processor 3 outputs through the output interface 4 a display signal for displaying the same number of microphone icons 58 as the desired number of wireless microphones 45 set in the areas 41 and displays the number of microphone icons 58 on the display device 20. It will be apparent to those skilled in the art from the present disclosure that the display form of the microphone icons 58 differs between before and after assignment of channels to the wireless microphones 45. This allows the user to check easily on the display screen 21 whether or not channels are assigned to the wireless microphones 45.

The processor 3 can be configured to have a function of setting the number of wireless microphones 45 used in the areas 41.

For example, the number of wireless microphones 45 in the areas 41 is set to 0 in an initial state. On the display screen 21, a group of microphone icons 58 corresponding to the respective channels is displayed, and a predetermined microphone icon 58 can be selected from the group of microphone icons 58 through the first input device 31 and is movable on the display screen 21. When the microphone icon 58 is arranged within a predetermined one of the areas 41 through the first input device 31, the processor 3 then increases the number of wireless microphones 45 used in the area 41 by one. Thus, operation of the microphone icon 58 causes the number of wireless microphones 45 used in the area 41 to be set.

The receiver icons 59 are movable through the first input device 31 on the display screen 21. When a receiver icon 59 is arranged within a predetermined one of the areas 41 through the first input device 31, the processor 3 causes the memory 2 to store the fact that the receiver 46 is arranged within the area 41. In the first setting, it is assumed that the arrangement of the receiver 46 within the area 41 is not limited, but may be, for example, arranged at any one of 27 locations. It will be apparent to those skilled in the art from the present disclosure that the arrangement range of the receiver 46 can be limited within the area 41, as described above (see FIG. 12). Also, as described above, the receiver 46 can be arranged at a predetermined location within the area 41 through an arrangement operation of the receiver icon 59 (see FIG. 13). The directivity of the receiver 46 can further be set (see FIG. 14). The arrangement and directivity of the receiver 46 can be operated through the first input device 31 on the display screen 21. The directivity information of the receiver 46 can be used as a parameter for estimating the desired-wave reception strength and the interference-wave reception strength.

(S2: Reception Strength Estimating Processing)

The reception strength estimating processing S2 will be described.

In the reception strength estimating processing S2, the parameters set in the layout setting processing S1 and held in the memory 2 as well as the propagation loss parameter, the directivity parameter, the obstacle parameter, and the obstacle arrangement parameter preliminarily stored in the memory 2 are used to estimate the reception strength in the same or adjacent channels between the areas 41.

In the reception strength estimating processing S2, the desired-wave reception strength and the interference-wave reception strength are calculated in a calculation target area 41x of two areas 41 selected from all the areas 41. It will be apparent to those skilled in the art from the present disclosure that the "calculation target area 41x" indicates one of the two areas 41 (the above-described area 41 of interest). The calculation target area 41x can be selected arbitrarily from the two selected areas 41.

First Embodiment of the Reception Strength Estimating Processing S2: In the Case where the Estimated Use Range 41M of the Wireless Microphone 45 and/or the Estimated Installation Range 41R of the Receiver 46 within the Area 41 are not Set The desired-wave reception strength will be described with reference to FIG. 16.

The desired-wave reception strength indicates the reception strength when the receiver 46 within the calculation target area 41x receives a transmission signal transmitted from a wireless microphone 45 that is arranged within the calculation target area 41x. Incidentally, the reception strength varies depending on an offset distance LA between the receiver 46 and the wireless microphone 45.

The calculation target area 41x is, for example, divided into three vertically equal portions, three horizontally and laterally equal portions, and three horizontally and longitudinally portions (in the direction perpendicular to the horizontal and lateral direction). That is, the calculation target area 41x is divided into 27 portions. An arrangement point PD is provided at the center of each of the 27 divided small areas. The receiver 46 and the wireless microphone 45 are numerically arranged at any one of the arrangement points PD.

The processor 3 calculates the reception strength for all sets of the 27 arrangements of the receiver 46 and the 27 arrangements of the wireless microphone 45.

The processor 3 makes the following calculation of the reception strength for a predetermined set. The processor 3 arranges the receiver 46 at a predetermined position selected from the 27 arrangement points PD and also arranges the wireless microphone 45 at a predetermined position selected from the 27 arrangement points PD. The processor 3 then calculates the offset distance LA between the receiver 46 and the wireless microphone 45 based on the arrangement of the receiver 46, the arrangement of the wireless microphone 45, and the layout information of the building. The processor 3 then obtains the reception strength based on the preliminarily stored reception strength calculation parameter and the offset distance LA.

The processor 3 calculates the reception strength for all sets of the 27 arrangements of the receiver 46 and the 27 arrangements of the wireless microphone 45 (27×27 strengths).

Alternatively, if an obstacle such as a pillar or a partition is set within the area 41, an attenuation may be calculated according to the obstacle and, based on the attenuation, the reception strength calculated based on the reception strength calculation parameter and the offset distance LA may be compensated for.

Figure 17:
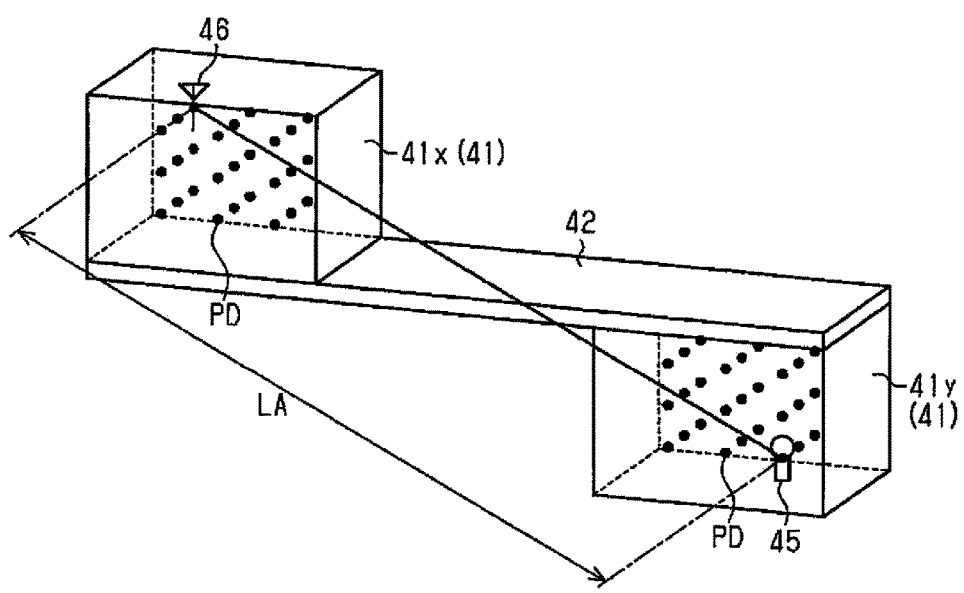
FIG. 17 is a perspective view of an area for illustrating a method for calculating the interference-wave reception strength.

The interference-wave reception strength will be described with reference to FIG. 17.

The interference-wave reception strength indicates the reception strength when the receiver 46 within the calculation target area 41x receives a transmission signal transmitted from a wireless microphone 45 that is arranged within the other area 41y, which is different from the calculation target area 41x. The reception strength varies depending on the offset distance LA between the receiver 46 and the wireless microphone 45.

An example method for calculating the interference-wave reception strength will be described.

In calculating the interference-wave reception strength, the other area 41y, which is different from the calculation target area 41x, is divided into three vertically equal portions, three horizontally and laterally equal portions, and three horizontally and longitudinally portions (in the direction perpendicular to the horizontal and lateral direction). That is, the area 41y is divided into 27 portions. An arrangement point PD is provided at the center of each of the 27 divided small areas. The wireless microphone 45 is numerically arranged at one of the arrangement points PD.

The processor 3 calculates the reception strength for all sets of the 27 arrangements of the receiver 46 in the calculation target area 41x and the 27 arrangements of the wireless microphone 45 in the other area 41y, which is different from the calculation target area 41x. That is, the processor 3 calculates the reception strength for sets of the 27 arrangements of the receiver 46 and the wireless microphone 45 (27×27 strengths).

The processor 3 makes the following calculation of the reception strength for a predetermined set. The processor 3 arranges the receiver 46 in the calculation target area 41x at a predetermined position selected from the 27 arrangement points PD. On the other hand, the processor 3 arranges the wireless microphone 45 in the other area 41y, which is different from the calculation target area 41x, at a predetermined position selected from the 27 arrangement points PD. The processor 3 then calculates the offset distance LA between the receiver 46 and the wireless microphone 45 based on the arrangement of the receiver 46, the arrangement of the wireless microphone 45, and the layout information of the building. The processor 3 also determines whether or not there is a void 44 or a partition wall 43 between the receiver 46 and the wireless microphone 45. The processor 3 then calculates the reception strength based on the reception strength calculation parameter and the offset distance LA. If there is an obstacle such as a partition wall 43 or a floor between the receiver 46 and the wireless microphone 45, the processor 3 calculates the attenuation amount by the obstacle and, based on the attenuation amount, compensates for the reception strength. For example, the processor 3 calculates the attenuation amount of the reception strength by the obstacle based on an obstacle arrangement parameter indicating the size of the partition wall 43 and an obstacle attenuation parameter indicating the degree of blockage of the material of the partition wall 43. The processor 3 then subtracts the attenuation amount calculated based on the obstacle arrangement parameter and the obstacle attenuation parameter from the reception strength calculated based on the reception strength calculation parameter and the offset distance LA and causes the memory 2 to store the thus obtained value as a reception strength.

It will be apparent to those skilled in the art from the present disclosure that the processor 3 may include the following processing. The processor 3 calculates the attenuation amount based on the effect of reflection (the attenuation of the transmission signal) at the partition wall 43 and the floor wall 42. For example, during calculation of the reception strength, the processor 3 calculates the attenuation amount or increase based on a reflection parameter indicating the degree of reflection at the partition wall 43 and the floor wall 42.

FIG. 18 is a table showing a desired-wave reception strength (D) within each area 41 and an interference-wave reception strength (U) between the areas 41. This table is an example for a building including areas A1, A2, and A3. Through the above-described processing, 729 desired-wave reception strengths (D) and 729 interference-wave reception strengths (U) according to the 27 locations at which the wireless microphone 45 is envisaged to be used within each area 41 and the 27 locations at which the receiver 46 is envisaged to be installed within each area 41 are calculated for each area 41 as shown in FIG. 18. The cell in the first row and the first column (area A1, area A1) indicates desired-wave reception strengths (D) within the area A1. The cell in the first row and the second column (area A1, area A2) indicates interference-wave reception strengths (U) if the receiver 46 is arranged in the area A1 and the wireless microphone 45 is arranged in the area A2 and when the receiver 46 in the area A1 receives a transmission signal transmitted from the wireless microphone 45 in the area A2. The same applies to the remaining cells.

Second Embodiment of the Reception Strength Estimating Processing S2: In the Case where the Estimated Use Range of the Wireless Microphone 45 and the Estimated Installation Range of the Receiver 46 within the Area 41 are Set If the estimated use range of the wireless microphone 45 is set, locations selected to arrange the wireless microphone 45 are not the 27 locations, but included limitedly in the estimated use range. For example, if ⅓ of the area 41 (in area ratio of ⅓) is set as the estimated use range of the wireless microphone 45, the number of points at which the wireless microphone 45 can be arranged is 9 (27 divided by 3). The same may apply to the estimated installation range of the receiver 46.

Figure 19:
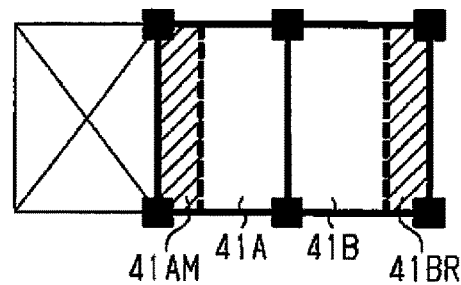
FIG. 19 is an image view showing an example of the estimated installation range of a receiver.

For example, as shown in FIG. 19, if the estimated use range 41AM of the wireless microphone 45 is set within one 41A of two areas 41A and 41B (at ⅓ of the range of the entire area 41A), while the estimated installation range 41BR of the receiver 46 is set within the other area 41B (at ⅓ of the range of the entire area 41B), the desired-wave reception strength and the interference-wave reception strength are calculated as follows.

The desired-wave reception strength within the area 41A is as follows. Since there are nine arrangements of the wireless microphone 45 envisaged to be used within the estimated use range 41AM of the area 41A and 27 arrangements of the receiver 46 envisaged to be installed within the area 41A, 9×27 (i.e. 243) calculations of the desired-wave reception strength within the area 41A are made, respectively.

The desired-wave reception strength within the area 41B is as follows. Since there are 27 arrangements of the wireless microphone 45 envisaged to be used within the area 41B and nine arrangements of the receiver 46 envisaged to be installed within the estimated installation range 41BR of the area 41B, 9×27 (i.e. 243) calculations of the desired-wave reception strength within the area 41B are made, respectively.

The interference-wave reception strength of a signal received by the receiver 46 in the area 41A between the areas 41A and 41B is as follows. Since there are 27 arrangements of the wireless microphone 45 envisaged to be used within the area 41B and 27 arrangements of the receiver 46 envisaged to be installed within the area 41A, 27×27 (i.e. 729) calculations of the interference-wave reception strength of a signal received by the receiver 46 in the area 41A are made, respectively.

It will be apparent to those skilled in the art from the present disclosure that as for the interference-wave reception strength of a signal received by the receiver 46 in the area 41B between the areas 41A and 41B, 81 calculations are made based on the arrangements (9 patterns) of the wireless microphone 45 envisaged to be used within the area 41A and the arrangements (9 patterns) of the receiver 46 envisaged to be installed within the area 41B. These calculations, which are included in the above-described 27×27 calculation patterns, can be skipped.

Figure 20:
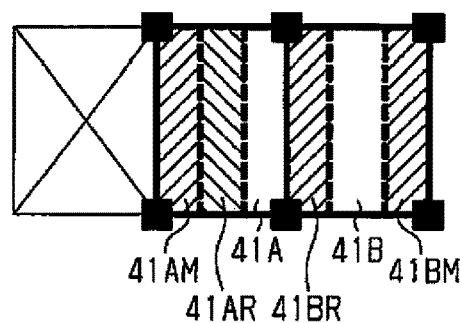
FIG. 20 is an image view showing another example of the estimated installation range of a receiver.

FIG. 20 shows another setting example of the estimated installation range of the receiver 46.

In this example, as shown in FIG. 20, within one 41A of two areas 41A and 41B, the estimated use range 41AM of the wireless microphone 45 is set (at ⅓ of the range of the entire area 41A) and also the estimated installation range 41AR of the receiver 46 is set (at ⅓ of the range of the entire area 41A).

Within the other area 41B, the estimated use range 41BM of the wireless microphone 45 is set (at ⅓ of the range of the entire area 41B) and also the estimated installation range 41BR of the receiver 46 is set (at ⅓ of the range of the entire area 41B).

The desired-wave reception strength within the area 41A is as follows. Since there are nine arrangements of the wireless microphone 45 envisaged to be used within the estimated use range 41AM of the area 41A and nine arrangements of the receiver 46 envisaged to be installed within the estimated installation range 41AR of the area 41A, 9×9 (i.e. 81) calculations of the desired-wave reception strength within the area 41A are made, respectively. Similarly, 9×9 (i.e. 81) calculations of the desired-wave reception strength within the area 41B are made, respectively.

The interference-wave reception strength of a signal received by the receiver 46 in the area 41A between the areas 41A and 41B is calculated as follows. Since there are nine arrangements of the wireless microphone 45 envisaged to be used within the estimated use range 41BM of the area 41B and nine arrangements of the receiver 46 envisaged to be installed within the estimated installation range 41AR of the area 41A, 9×9 (i.e. 81) calculations of the interference-wave reception strength of a signal received by the receiver 46 within the area 41A are made, respectively.

The interference-wave reception strength of a signal received by the receiver 46 in the area 41B between the areas 41A and 41B is calculated as follows. Since there are nine arrangements of the wireless microphone 45 envisaged to be used within the estimated use range 41AM of the area 41A and nine arrangements of the receiver 46 envisaged to be installed within the estimated installation range 41BR of the area 41B, 9×9 (i.e. 81) calculations of the interference-wave reception strength of a signal received by the receiver 46 within the area 41B are made, respectively.

As described above, if any one of the estimated use range 41AM, 41BM of the wireless microphone 45 and the estimated installation range 41AR, 41BR of the receiver 46 is set, the number of patters selectable as the arrangement of the wireless microphone 45 and the receiver 46 is limited. This reduces the number of calculations required to derive the desired-wave reception strength and the interference-wave reception strength. This causes the load on the processor 3 to be reduced and also the time required to derive predetermined results through a calculation by the processor 3 to be shortened.

Third Embodiment of the Reception Strength Estimating Processing S2: In the Case where the Arrangement Position of the Receiver 46 is Set As shown in FIG. 13, if the arrangement position of the receiver 46 is not set in the height direction but set on a plane, the desired-wave reception strength and the interference-wave reception strength are calculated as follows.

The desired-wave reception strength within the area 41A is calculated as follows. Since there are 27 arrangements of the wireless microphone 45 envisaged to be used within the area 41A and three arrangements of the receiver 46 envisaged to be installed within the area 41A, 27×3 (i.e. 81) calculations of the desired-wave reception strength within the area 41A are made, respectively.

It will be apparent to those skilled in the art from the present disclosure that if the arrangement position of the receiver 46 is set not only on the plane position but also in the height position, the number of selections for the arrangement position of the receiver 46 is one. In this case, 27×1 (i.e. 27) calculations of the desired-wave reception strength are made, respectively.

Similarly to the case within the area 41A, since the number of selections for the arrangement of the wireless microphone 45 is 27 and the number of selections for the arrangement of the receiver 46 is three, 27×1 (i.e. 27) calculations of the desired-wave reception strength within the area 41B are made, respectively. It will be apparent to those skilled in the art from the present disclosure that if the arrangement position of the receiver 46 is set not only on the plane position but also in the height position, the number of selections for the arrangement position of the receiver 46 is one. In this case, 27×1 (i.e. 27) calculations of the desired-wave reception strength are made, respectively.

The interference-wave reception strength of a signal received by the receiver 46 in the area 41A between the areas 41A and 41B is calculated as follows. Since there are 27 arrangements of the wireless microphone 45 envisaged to be used within the area 41B and three arrangements of the receiver 46 envisaged to be installed within the area 41A, 27×3 (i.e. 81) calculations of the interference-wave reception strength within the area 41A are made, respectively. It will be apparent to those skilled in the art from the present disclosure that if the arrangement position of the receiver 46 is set not only on the plane position but also in the height position, the number of selections for the arrangement position of the receiver 46 is one. In this case, 27×1 (i.e. 27) calculations of the interference-wave reception strength are made, respectively.

The interference-wave reception strength of a signal received by the receiver 46 in the area 41B between the areas 41A and 41B is calculated as follows. Since there are 27 arrangements of the wireless microphone 45 envisaged to be used within the area 41A and three arrangements of the receiver 46 envisaged to be installed within the area 41B, 27×3 (i.e. 81) calculations of the interference-wave reception strength within the area 41B are made, respectively. It will be apparent to those skilled in the art from the present disclosure that if the arrangement position of the receiver 46 is set not only on the plane position but also in the height position, the number of selections for the arrangement position of the receiver 46 is one, and therefore 27×1 (i.e. 27) calculations of the interference-wave reception strength are made, respectively.

It will be apparent to those skilled in the art from the present disclosure that if multiple receivers 46 are installed within at least one of the areas 41A and 41B, the desired-wave reception strength and the interference-wave reception strength are calculated in the same way as described above for each set of the arrangement of the wireless microphone 45 and the arrangement of the receiver 46 for each of the multiple receivers 46.

Fourth Embodiment of the Reception Strength Estimating Processing S2: In the Case where the Directivity of the Receiver 46 is Set If the directivity of each receiver 46 is set as shown in FIG. 14, a directivity parameter is used in calculating the desired-wave reception strength and the interference-wave reception strength.

For example, if the receiver 46 is arranged at one of the 27 arrangement positions and the directivity of the receiver 46 is set, 27 calculations of the desired-wave reception strength are made because there are 27 arrangements of the wireless microphone 45. Among these 27 calculations, the sets in which a transmission signal from the wireless microphone 45 may propagate in the direction along the directivity of the receiver 46 are calculated in the same way as the case where the receiver 46 is not set with a directional antenna. On the other hand, among the 27 calculations, the sets in which a transmission signal from the wireless microphone 45 may propagate in a direction other than the direction along the directivity of the receiver 46 are calculated using a directivity parameter.

A method for calculating the desired-wave reception strength and the interference-wave reception strength in view of the directivity of a receiver 46 will be described with reference to FIGS. 21 to 24. In FIGS. 21 to 24, the direction of transmission from each of the wireless microphones 45 is indicated by arrows. The orientation of the arrows indicates the transmission direction estimated most likely to be received by the receiver 46 (hereinafter referred to as "reception contributing transmission direction") among the transmission directions in all directions from the wireless microphone 45 arranged at the arrangement position.

Figure 21:
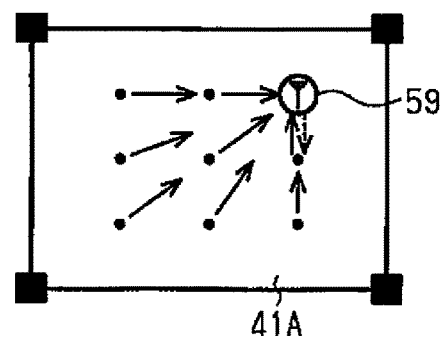
FIG. 21 shows the direction of transmissions from wireless microphones in an example of the arrangement of a receiver.

FIG. 21 is a schematic view for calculating the desired-wave reception strength in the area 41A in which the receiver 46 having directivity is arranged.

In FIG. 21, a receiver icon 59 indicating the receiver 46 is arranged at an upper right arrangement position in the area 41A. In FIG. 21, the directivity of the receiver 46 is oriented downward (indicated by the broken arrow). In this case, the transmission direction (reception contributing transmission direction) of the wireless microphones 45 arranged at nine arrangement positions (including the arrangements in different height direction) on the right side in the area 41A matches the directivity of the receiver 46. For this reason, the desired-wave reception strength for the sets of the arrangement positions of these wireless microphones 45 and the arrangement position of the receiver 46 is calculated without using the directivity parameter. That is, in the case where the desired-wave reception strength is calculated within the area 41A, nine of the 27 (27×1) calculations are made without using the directivity parameter, while the calculations are made using the directivity parameter for 18 of the 27 (27×1) calculations.

Figure 22:
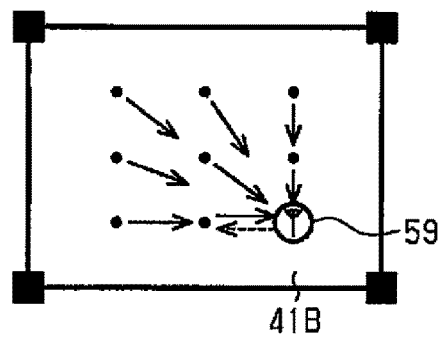
FIG. 22 shows the direction of transmissions from wireless microphones in an example of the arrangement of a receiver.

FIG. 22 is a schematic view for calculating the desired-wave reception strength in the area 41B in which the receiver 46 having directivity is arranged.

In FIG. 22, a receiver icon 59 indicating the receiver 46 is arranged at a lower right arrangement position in the area 41B. In FIG. 22, the directivity of the receiver 46 is oriented leftward (indicated by the broken arrow). In this case, the transmission direction (reception contributing transmission direction) of the wireless microphones 45 arranged at nine arrangement positions (including the arrangements in different height direction) on the lower side in the area 41B matches the directivity of the receiver 46. For this reason, the desired-wave reception strength for the sets of the arrangement positions of these wireless microphones 45 and the arrangement position of the receiver 46 is calculated without using the directivity parameter. That is, in the case where the desired-wave reception strength is calculated within the area 41B, nine of the 27 (27×1) calculations are made without using the directivity parameter, while the calculations are made using the directivity parameter for 18 of the 27 (27×1) calculations.

Figure 23:
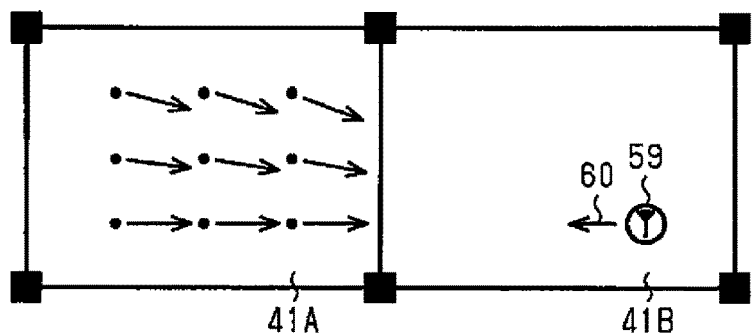
FIG. 23 shows the directivity of a receiver and the direction of transmissions from wireless microphones in an example of the arrangement of the receiver.

FIG. 23 is a schematic view for calculating, in the area 41B in which the receiver 46 having directivity is arranged, the interference-wave reception strength of a signal received by the receiver 46 in the area 41B between the areas 41A and 41B.

In FIG. 23, a receiver icon 59 indicating the receiver 46 is arranged at a lower right arrangement position in the area 41B. In FIG. 23, the directivity of the receiver 46 is oriented leftward (indicated by the arrow icon 60). In this case, the transmission direction (reception contributing transmission direction) of the wireless microphones 45 arranged at nine arrangement positions (including the arrangements in different height direction) on the lower side in the area 41A matches the directivity of the receiver 46. For this reason, the interference-wave reception strength for the sets of the arrangement positions of these wireless microphones 45 and the arrangement position of the receiver 46 is calculated without using the directivity parameter. That is, in the case where the interference-wave reception strength is calculated within the area 41B, nine of the 27 (27×1) calculations are made without using the directivity parameter, while the calculations are made using the directivity parameter for 18 of the 27 (27×1) calculations.

Figure 24:
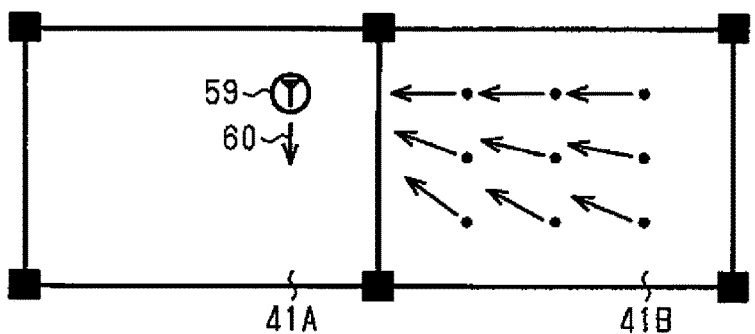
FIG. 24 shows the directivity of a receiver and the direction of transmissions from wireless microphones in an example of the arrangement of the receiver.

FIG. 24 is a schematic view for calculating, in the area 41A in which the receiver 46 having directivity is arranged, the interference-wave reception strength of a signal received by the receiver 46 in the area 41A between the areas 41A and 41B.

In FIG. 24, a receiver icon 59 indicating the receiver 46 is arranged at an upper right arrangement position in the area 41A. In FIG. 24, the directivity of the receiver 46 is oriented downward (indicated by the arrow icon 60). In this case, no transmission direction (reception contributing transmission direction) of the wireless microphones 45 arranged at 27 arrangement positions (including the arrangements in different height direction) in the area 41B matches the directivity of the receiver 46. For this reason, the interference-wave reception strength for all the sets of the arrangement positions of these wireless microphones 45 and the predetermined arrangement position of the receiver 46 is calculated using the directivity parameter. That is, in the case where the interference-wave reception strength is calculated within the area 41A 27 of the 27 (27×1) calculations are made using the directivity parameter.

It will be apparent to those skilled in the art from the present disclosure that if multiple receivers 46 are installed within the area 41A, the desired-wave reception strength and the interference-wave reception strength are calculated based on the arrangement positions of the wireless microphones 45, the arrangement positions of the receivers 46, and the directivity of each receiver 46.

In FIGS. 21 to 24, if the transmission direction of the wireless microphones 45 matches the directivity of the receiver 46, the directivity parameter is not used to calculate the desired-wave reception strength and the interference-wave reception strength, but the directivity parameter is used in the following case. That is, when the processor 3 treats separately the directivity parameter when the transmission direction of the wireless microphones 45 matches the directivity of the receiver 46 and the directivity parameter when the transmission direction of the wireless microphones 45 does not match the directivity of the receiver 46, the directivity parameters are used differently depending on the degree of matching.

Incidentally, it is envisaged that the directivity of the receiver 46 is not set but only the directivity of the receiver 46 (presence or absence of directivity) is set. In order to address such a case, the processor 3 can be configured as follows. When the directivity is not set by the user and only the presence or absence is set, the processor 3 sets the directivity of the receiver 46 along the direction from the center of the receiver 46 to the center of the room (area 41) based on the rational installation of a directional antenna.

(S3: Interference Determining Processing)

The interference determining processing S3 is used to determine, when the same channel or adjacent channels are assigned to two areas 41, whether or not interference occurs between the two areas 41 based on the results shown in FIG. 18 (i.e. the desired-wave reception strength and the interference-wave reception strength for each area 41).

The processor 3 determines for each area 41 whether or not the ratio between the desired-wave reception strength and the interference-wave reception strength (logarithmic difference therebetween if the desired-wave reception strength and the interference-wave reception strength are in a logarithmic form) obtained in the reception strength estimating processing S2 meets an interference reducing condition under which the interference of the wireless microphones 45 is reduced (see below). For example, if the desired-wave reception strength is sufficiently higher than the interference-wave reception strength, it is determined that no interference occurs.

For example, in the interference determining processing S3, the worst case among the sets of the desired-wave reception strength (D) and the interference-wave reception strength (U) calculated in the reception strength estimating processing S2 for each area 41 is selected and the ratio of the desired-wave reception strength to the interference-wave reception strength (hereinafter referred to as "D/U ratio") for the set is calculated to determine whether or not the D/U ratio is equal to or greater than a predetermined tolerance. In an example, the worst case is a set of the lowest value of the desired-wave reception strength and the highest value of the interference-wave reception strength.

In another example of the worst case, the lowest value of the desired-wave reception strength is excluded and the second value of the lowest desired-wave reception strength is used with respect to the desired-wave reception strength used for calculation of the D/U ratio.

Figure 25:
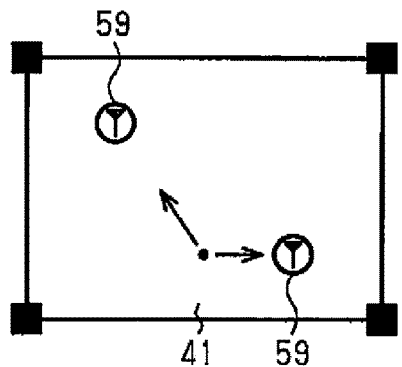
FIG. 25 shows the arrangement of two receivers and the direction of transmissions from a wireless microphone in an example of the arrangement of the receivers.

This is for the following reason. As shown in FIG. 25, if multiple receivers 46 are installed within the area 41 to provide a diversity, a transmission signal transmitted from the wireless microphone 45 is received by the multiple receivers 46. During signal reproduction, the signal having the higher reception strength is used preferentially. In the example shown in FIG. 25, the transmission signal transmitted from the wireless microphone 45 is received by the two receivers 46. Since the upper left receiver 46 is arranged farther from the wireless microphone 45 than the lower right receiver 46, the reception strength of the signal received at the upper left receiver 46 is lower than the reception strength of the signal received at the lower right receiver 46. In this case, the signal having the lower reception strength is not used for the reproduction or less likely to contribute to the signal processing for the reproduction.

Figure 26:
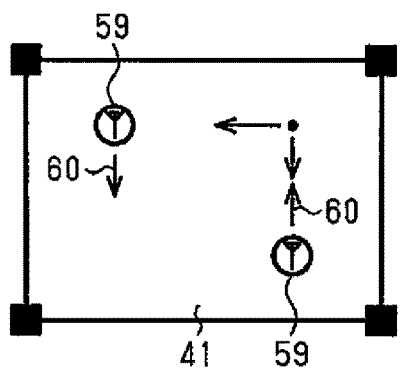
FIG. 26 shows the directivity of receivers and the direction of transmissions from a wireless microphone in an example of the arrangement of the receivers.

Alternatively, as shown in FIG. 26, if multiple receivers 46 having their respective different directivities are installed within the area 41 to provide a diversity, a transmission signal transmitted from the wireless microphone 45 is received by the multiple receivers 46. During signal reproduction, the signal having the higher reception strength is used preferentially. In the example shown in FIG. 26, the transmission signal transmitted from the wireless microphone 45 is received by the two receivers 46. The directivity of the upper left receiver 46 does not match the direction (reception contributing transmission direction) of a transmission signal transmitted from the wireless microphone 45. In contrast, the directivity of the lower right receiver 46 matches the direction (reception contributing transmission direction) of a transmission signal transmitted from the wireless microphone 45. For this reason, the reception strength of the signal received at the upper left receiver 46 is lower than the reception strength of the signal received at the lower right receiver 46. In this case, the signal having the lower reception strength is not used for the reproduction or less likely to contribute to the signal processing for the reproduction.

As shown in the two examples above, if multiple receivers 46 are installed within the area 41 to provide a diversity, the lowest desired-wave reception strength is not used for reproduction. Accordingly, if there is provided a diversity, the lowest value of the desired-wave reception strength is preferably not used when calculating the D/U ratio.

Another example of the interference determining processing S3 will be described. In the interference determining processing S3, it is determined as follows whether or not interference occurs between two areas 41. In the interference determining processing S3, it is determined whether or not an interference reducing condition is met under which the interference of the wireless microphones 45 is reduced based on the desired-wave reception strength and the interference-wave reception strength estimated as described above.

The interference reducing condition is related to the relationship between a calculation target area 41x and the other area 41y, which is different from the calculation target area 41x, in which the value obtained by subtracting the interference-wave reception strength from the other area 41y from the desired-wave reception strength ("desired-wave reception strength (dB)"–"interference-wave reception strength (dB)" (an example of the D/U ratio)) is equal to or greater than a tolerance (e.g. 30 dB or more). This is because if the difference between the desired-wave reception strength and the interference-wave reception strength is thus equal to or greater than the tolerance, the interference-wave reception strength is relatively and critically low and no interference substantially occurs.

In a certain embodiment, in the interference determining processing S3, the processor 3 determines whether or not the difference between the desired-wave reception strength and the interference-wave reception strength is equal to or greater than the tolerance, equal to or greater than a lower limit value (smaller than the tolerance) but smaller than the tolerance, or smaller than the lower limit value. When the difference between the desired-wave reception strength and the interference-wave reception strength is equal to or greater than the tolerance, the interference reducing condition is met. When the difference between the desired-wave reception strength and the interference-wave reception strength is equal to or greater than the lower limit value but smaller than the tolerance, it is determined that interference becomes more likely to occur. When the difference between the desired-wave reception strength and the interference-wave reception strength is smaller than the lower limit value, it is determined that interference becomes even more likely to occur and therefore there is interference.

Figure 27:
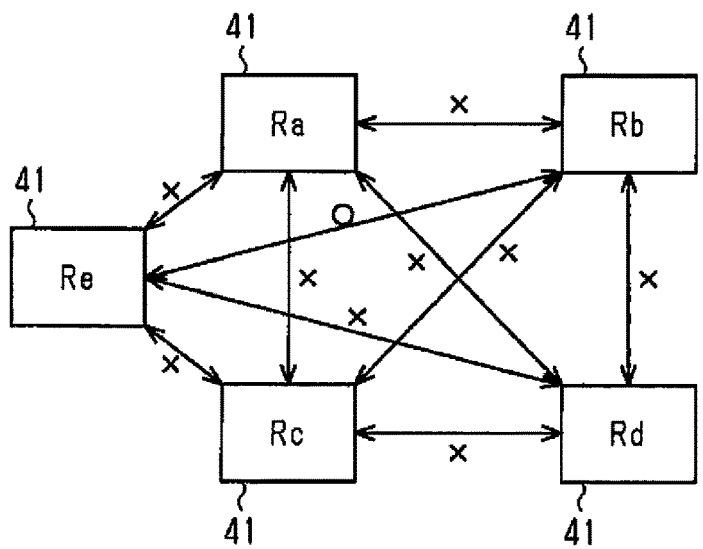
FIG. 27 is a schematic view showing the relationship between the arrangement of areas and the results of interference determination processing.

FIG. 27 is a schematic view showing the relationship between the arrangement of multiple areas 41 and the results of the interference determining processing 53. FIG. 28 is a table showing the results of the interference determining processing S3. In FIGS. 27 and 28, the areas 41 are named Ra, Rb, Rc, Rd, and Re. For distinction between these areas 41, reference will hereinafter be made to, for example, "area 41(Ra)." In FIG. 27, the correlation between a set of two areas 41 selected from all the areas 41 is made using an arrow. The arrow for each set is then accompanied by the corresponding results of the interference determining processing S3. It will be apparent to those skilled in the art from the present disclosure that the "○" mark indicates that the D/U ratio is equal to or greater than the tolerance and means that interference does not or is less likely to occur. The "x" mark indicates that the D/U ratio is smaller than the tolerance and means that interference is more likely to occur. In the table shown in FIG. 28, the D/U ratio is equal to or greater than the tolerance between the area 41(Rb) and the area 41(Re). Between two areas 41 other than the set, the D/U ratio is smaller than the tolerance. It will be apparent to those skilled in the art from the present disclosure that the results of the interference determining processing S3 for each area 41 may not be provided by such a "○" and "x" as shown in FIG. 28 or alternative two values (e.g. "0" and "1"), but may be provided by the D/U ratio, which is original data of the determination in the interference determining processing S3 (see FIG. 29).

FIG. 29 is a table showing the D/U ratio. FIG. 29 shows the D/U ratio for all the sets of two areas 41. Such results of the interference determining processing S3 (provided by the D/U ratio) can be output in a predetermined format such as a csv (comma-separated-values) format.

(S4: Automatic Channel Plan Preparing Processing)

The automatic channel plan preparing processing S4 is used to automatically prepare a channel plan 62 for wireless microphones 45 to be assigned to each area 41 based on the results of the interference determining processing S3.

Channels to be assigned to the wireless microphones 45 are selected from a group (channel list) of channels predefined as channels assignable to the wireless microphones 45. The channels in the group are set at a predetermined frequency interval. The group of channels may be defined by, for example, legal restraints and/or organizations in each country. The legal restraints and organizations include, for example, ARIB (Association of Radio Industries and Businesses) in Japan, FCC (Federal Communications Commission) in U.S., and ACMA (Australian Communications and Media Authority) in Australia.

Here is shown an example in which channels are selected from a group of channels of 800 MHz band (806.125 MHz to 809.750 MHz), as shown in FIG. 30. In this example, 30 channels are defined at an interval of 125 KHz in the 800 MHz band. In this example, the 30 channels are also divided into six groups so that the channels in the same group are separated by 750 KHz.

In the automatic channel plan preparing processing S4, the processor 3 selects channels assignable to the wireless microphones 45 in each area 41 from the group of channels based on the desired number set in the layout setting processing S1 and the results of the interference determining processing S3 according to a channel assignment rule to prepare a channel plan 62. An example of the channel assignment rule will hereinafter be described.

(S4-1)

In an example, the channel assignment rule includes first to third rules.

Under the first rule, the same channel is not allowed to be used and different channels shall be used within the same area 41.

Under the second rule, during assignment of channels to wireless microphones 45 arranged in a predetermined area 41, reference shall be made to the results of the interference determining processing S3 and channels shall be assigned with which no interference can occur in relation to the other areas 41. Accordingly, the same channel is allowed to be used between areas 41 (indicated by the "○" in FIG. 28) determined that no interference occurs therebetween in the results of the interference determining processing S3. On the other hand, the same channel is not allowed to be used between areas 41 (indicated by the "x" in FIG. 28) determined that interference occurs therebetween in the results of the interference determining processing S3.

Under the third rule, assignment of channels to each area 41 shall be made in ascending order of frequency. In a certain embodiment, in the case of grouping as shown in the table of FIG. 30, assignment of channels to the wireless microphones 45 in each area 41 is made in the order of the channels F1, D1, B1, E1, C1, A1, F2 . . . .

Based on the foregoing rules, the processor 3 assigns channels to the wireless microphones 45 arranged in the area 41 at each floor. The thus prepared channel plan 62 is stored in the memory 2.

FIG. 31 is an example of the channel plan 62 generated in the automatic channel plan preparing processing S4. In the example of FIG. 31, the desired number of wireless microphones 45 is set to 10, 5, 9, 6, and 3 in the respective areas 41(Ra) to 41(Re).

This example indicates the channel plan 62 prepared based on the results of the interference determining processing S3 shown in FIG. 28. The cells in the leftmost column each show the name of the area 41. The cells in the second column each show the desired number of wireless microphones 45 arranged in each area 41 (i.e. the desired number set by the user) and the number of assigned channels (assignment number). The cells in the third column each show whether or not channels are assigned entirely for the desired number by the user. If channels are assigned entirely for the desired number by the user, the cell is set "full," while if channels are not assigned entirely for the desired number by the user, the cell is set "not full." The cells in the fourth column each show channels assigned to the area 41.

First, in the area 41(Ra), channels are assigned to the wireless microphones 45 in ascending order of frequency so that the same channel is not used within the area 41.

In the area 41(Rb), assignment of the same channel is not allowed in relation to the area 41(Ra) (determined "x" in FIG. 28). For this reason, among the channels other than those assigned to the area 41(Ra), channels are assigned to the wireless microphones 45 in the area 41(Rb) in ascending order of frequency.

In the area 41(Rc), assignment of the same channel as in any one of the areas 41 is not allowed in relation to the areas 41(Ra) and 41(Rb) (determined "x" in FIG. 28). For this reason, among the channels other than those assigned to the areas 41(Ra) and 41(Rb), channels are assigned to the wireless microphones 45 in the area 41(Rc) in ascending order of frequency.

In the area 41(Rd), assignment of the same channel as in any one of the areas 41 is not allowed in relation to the areas 41(Ra), 41(Rb), and 41(Rc) (determined "x" in FIG. 28). For this reason, among the channels other than those assigned to the areas 41(Ra), 41(Rb), and 41(Rc), channels are assigned to the wireless microphones 45 in the area 41(Rd) in ascending order of frequency.

In the area 41(Re), assignment of the same channel as in any one of the areas 41 is not allowed in relation to the areas 41(Ra), 41(Rc), and 41(Rd) (determined "x" in FIG. 28). On the other hand, in the area 41(Re), assignment of the same channel is allowed in relation to the area 41(Rb) (determined "○" in FIG. 28). For this reason, among the channels assigned to the area 41(Rb), channels are assigned to the wireless microphones 45 in the area 41(Re) in ascending order of frequency. As described above, in the example shown in FIG. 31, channels are thus assigned to reach the desired number in all areas 41 of areas 41(Ra) to 41(Re).

FIG. 32 is another example of the channel plan 62 generated in the automatic channel plan preparing processing S4. In this example, the number (desired number) of wireless microphones 45 arranged in the area 41(Re) is increased to seven from the example shown in FIG. 31.

Also in this example, different channels are assigned to the respective areas 41(Ra) to 41(Rd). Similarly to the case in FIG. 31, since the same channel can be assigned to the areas 41(Re) and 41(Rb), the same channels as those assigned to the wireless microphones 45 in the area 41(Rb) can be assigned to the wireless microphones 45 in the area 41(Re). However, the desired number of wireless microphones 45 in the area 41(Re) is seven, while the number of assignable channels is five. In addition, no assignable channel remains. For this reason, in this example, no channel is assigned to the area 41(Re).

In such a case, the processor 3 may prepare a channel plan 62 (first alternative) to assign channels to the area 41(Re). In an example, assignable channels are only assigned to the area 41(Re). That is, a recommendation (channel plan 62) is provided that the number of wireless microphones assignable is up to five, though the desired number of wireless microphones 45 in the area 41(Re) is seven. For example, the same channels C2, A2, F3, D3, and B3 as in the area 41(Rb) are assigned to five wireless microphones 45 in the area 41(Re).

The processor 3 may further prepare an alternative channel plan 62 so as not to make one of the areas 41 other than the area 41(Re) full instead of making the area 41(Re) full. For example, a channel plan 62 (second alternative) is prepared so as not to make the area 41(Rd) full instead of making the area 41(Re) full. In the example shown in FIG. 33, the desired number of wireless microphones 45 in the area 41(Rd) is six, while four channels are assigned. This causes channels (e.g. channels C5, A5) not used in any one of the areas 41 to be created. These two channels are then assigned to the area 41(Re). This causes channels to be assigned to the seven respective wireless microphones 45 of the desired number in the area 41(Re).

(S4-2)

Another example of the channel assignment rule will be described with reference to FIGS. 34 to 37.

In another example, the channel assignment rule includes the following first to third rules.

Under the first rule, the same channel is not allowed to be used, channels with a frequency interval therebetween smaller than a predetermined frequency are not allowed to be used, and channels other than these channels shall be used within the same area 41. The predetermined frequency is set at, for example, 375 KHz. Channels with a frequency interval therebetween smaller than the predetermined frequency are not allowed to be used because use of multiple channels within a predetermined frequency range within the same area 41 could cause interference. In the examples shown in FIGS. 34 to 37, the predetermined frequency is set at 375 KHz.

Under the second rule, during assignment of channels to wireless microphones 45 arranged in a predetermined area 41, reference shall be made to the results of the interference determining processing S3 and channels shall be assigned with which no interference can occur in relation to the other areas 41. In a certain embodiment, the same channel is allowed to be used between areas 41 (indicated by the "○" in FIG. 28) determined that no interference occurs between the areas 41 in the results of the interference determining processing S3. Under this rule, the same channel and adjacent channels (e.g. channels with an interval from the same channel of smaller than 375 KHz) are not allowed to be used between areas 41 (indicated by the "x" mark in FIG. 28) determined that interference occurs therebetween in the results of the interference determining processing S3.

Under the third rule, assignment of channels to each area 41 shall be made in ascending order of frequency. In a certain embodiment, in the case of grouping as shown in the table of FIG. 30, assignment of channels to the wireless microphones 45 in each area 41 is made in the order of the channels F1, D1, B1, E1, C1, A1, F2 . . . . It will be apparent to those skilled in the art from the present disclosure that since the first rule exists, selection is made every three channels in this channel arrangement.

FIG. 34 is an example of the channel plan 62 generated in the automatic channel plan preparing processing S4. In the example of FIG. 34, the desired number of wireless microphones 45 is set to 4, 4, 1, 1, and 3 in the respective areas 41(Ra) to 41(Re). The example in FIG. 34 also indicates the channel plan 62 prepared based on the results of the interference determining processing S3 shown in FIG. 28.

In this example, channels are first assigned to the wireless microphones 45 in the area 41(Ra) in ascending order of frequency at an interval of 375 KHz.

In the area 41(Rb), assignment of the same channel and adjacent channels is not allowed in relation to the area 41(Ra) (determined "x" in FIG. 28). For this reason, among the channels other than those assigned to the area 41(Ra), channels are assigned to the wireless microphones 45 in the area 41(Rb) in ascending order of frequency at an interval of 375 KHz.

In the area 41(Rc), assignment of the same channel as in any one of the areas 41 and adjacent channels is not allowed in relation to the areas 41(Ra) and 41(Rb) (determined "x" in FIG. 28). For this reason, among the channels other than those assigned to the areas 41(Ra) and 41(Rb), channels are assigned to the wireless microphones 45 in the area 41(Rc) in ascending order of frequency at an interval of 375 KHz.

In the area 41(Rd), assignment of the same channel as in any one of the areas 41 and adjacent channels is not allowed in relation to the areas 41(Ra), 41(Rb), and 41(Rc) (determined "x" in FIG. 28). For this reason, among the channels other than those assigned to the areas 41(Ra), 41(Rb), and 41(Rc), channels are assigned to the wireless microphones 45 in the area 41(Rd) in ascending order of frequency at an interval of 375 KHz.

In the area 41(Re), assignment of the same channel as in any one of the areas 41 and adjacent channels is not allowed in relation to the areas 41(Ra), 41(Rc), and 41(Rd) (determined "x" in FIG. 28). On the other hand, in the area 41(Re), assignment of the same channel is allowed in relation to the area 41(Rb) (determined "○" in FIG. 28). For this reason, among the channels assigned to the area 41(Rb), channels are assigned to the wireless microphones 45 in the area 41(Re) in ascending order of frequency. In this example, channels are assigned to reach the desired number in all the areas 41(Ra) to 41(Re). As described above, in this example, channels are thus assigned to reach the desired number in all the areas 41(Ra) to 41(Re).

FIG. 35 is another example of the channel plan 62 generated in the automatic channel plan preparing processing S4. In this example, the number (desired number) of wireless microphones 45 arranged in the areas 41(Rb) to 41(Rd) is changed from the example shown in FIG. 34.

If the desired number of wireless microphones 45 is thus set, assigning channels to each area 41 according to the foregoing first to third rules causes no channel to be assigned to the areas 41(Rd) and 41(Re).

In such a case, the processor 3 may prepare a channel plan 62 (first alternative) to assign channels to the areas 41(Rd) and 41(Re), as shown in FIG. 36. In this example, assignable channels are only assigned to the areas 41(Rd) and 41(Re). That is, a recommendation (channel plan 62) is provided that the number of wireless microphones 45 assignable by the processor 3 is up to one, though the desired number of wireless microphones 45 in the area 41(Rd) is two, and that the number of wireless microphones 45 assignable is up to two, though the desired number of wireless microphones 45 in the area 41(Re) is four.

The processor 3 may further prepare an alternative channel plan 62 so as not to make one of the areas 41 other than the area 41(Rc) full instead of making the area 41(Rc) full, as shown in FIG. 37. For example, a channel plan 62 (second alternative) is prepared to make the areas 41(Re) and 41(Rd) full instead of not making the area 41(Rc) full. In this example, the processor 3 assigns channels preferentially to the area 41(Rd). That is, channels are assigned in the order of the areas 41(Rd), 41(Re), 41(Ra), 41(Rb), and 41(Rc). Channel assignment in this order according to the first to third rules causes channels to be assigned to the areas 41(Ra, Rb, Rd, Re) other than the area 41(Rc). As a result, the number of areas 41 reaching the desired number is larger than the example shown in FIG. 36.

Changing the order of channel assignment to each area 41 may thus cause the number of areas 41 reaching the desired number to change. Hence, the processor 3 can be configured as follows. That is, the processor 3 prepares multiple patterns of the order of channel assignment to multiple areas 41 and, for each of the assignment order patterns, performs the automatic channel plan preparing processing S4. The number of areas 41 reaching the desired number is then compared among the thus prepared multiple channel plans 62, and the channel plan 62 with the largest number of areas 41 reaching the desired number is recommended as a first plan.

A channel table 61 that can be displayed on the display screen 21 after the automatic channel plan preparing processing S4 will be described with reference to FIG. 38.

After completion of the automatic channel plan preparing processing S4, the wireless microphones 45 in each area 41 have been assigned channels. The processor 3 then outputs a display signal for displaying a channel table 61 for each area 41 and, based on this display signal, displays the channel table 61 on the display device 20.

For example, if a predetermined area 41 is selected through the first input device 31 in the automatic channel plan preparing processing S4, the processor 3 outputs through the output interface 4 a display signal for displaying a channel table 61 for the area 41 and, based on the information, displays the channel table 61 on the display device 20. The channel table 61 provides information indicating channels assigned to the wireless microphones 45 used in the area 41, channels not allowed to be used in the area 41, and channels allowed to be used in the area 41.

Figures 38A, 38B:
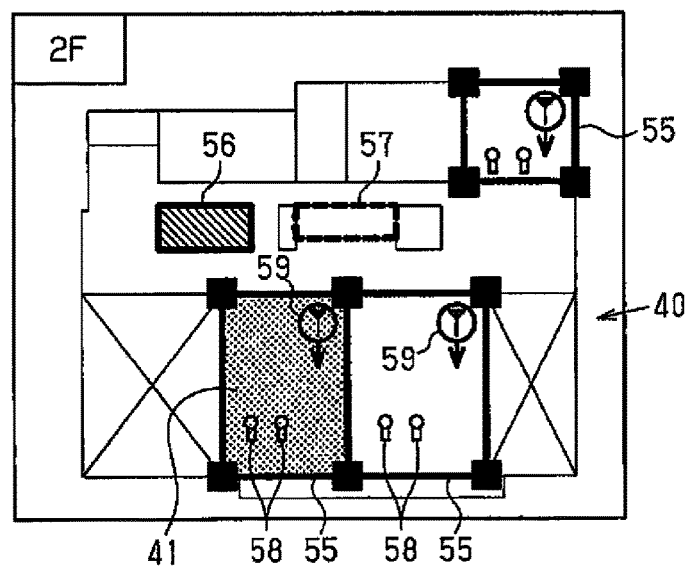
FIG. 38A is an image view showing the layout with an area selected therein.
FIG. 38B is an image view showing a channel table for the selected area.

In FIG. 38A, the selected area 41 is dot-hatched.

FIG. 38B is an example of the channel table 61 displayed on the display screen 21. In this table, each column represents a group of channels. The numerals 1 to 5 are signs for distinguishing channels within each group. The checkmark "V" indicates a channel assigned to the wireless microphone 45 in the area 41. Cross mark "x" indicates a channel not allowed to be used in the area 41. Channels without checkmark V or cross mark x are allowed to be used in the area 41.

In accordance with such a table, the user can easily find the channel assigned to the wireless microphone 45 used in the area 41. It is also possible to find other channels allowed to be used in the area 41.

(S5: Manual Channel Determining Processing)

The manual channel determining processing S5 uses the results of the interference determining processing S3 to determine whether or not a channel selected by the user can be used (assigned) or determine whether or not a channel selected by the user can be used for an area 41. For example, when channels are assigned to the wireless microphones 45 in each area 41 and in the case of adding a wireless microphone 45 with a predetermining channel to a predetermined area 41, the processor 3 performs the manual channel determining processing to determine whether or not the channel can be used. Also, the processor 3 performs the manual channel determining processing to determine whether or not the wireless microphone 45 with the predetermining channel can be used for the selected area 41.

The channel that can be selected by the user is limited to a group (channel list) of channels predefined as channels assignable to the wireless microphone 45. The group of channels may be defined by, for example, legal restraints and/or organizations in each country. The legal restraints and organizations include, for example, ARIB (Association of Radio Industries and Businesses) in Japan, FCC (Federal Communications Commission) in U.S., and ACMA (Australian Communications and Media Authority) in Australia.

Here is shown an example in which channels are selected from a group of channels of 800 MHz band (806.125 MHz to 809.750 MHz), as shown in FIG. 30. In this example, 30 channels are defined at an interval of 125 KHz in the 800 MHz band. In this example, the 30 channels are also divided into six groups so that the channels in the same group are separated by 750 KHz.

(S5-1: First Aspect)

In the manual channel determining processing S5 according to a first aspect, the processor 3 receives a first operation (selection operation) for selecting one or more channels from the group of channels described above. During reception of the first operation, the processor 3 then derives an area 41 in which the channel selected through the first operation (hereinafter referred to as "selected channel") can be used based on the results of the interference determining processing S3 according to a predetermined rule and displays the derived area 41.

Figure 39:
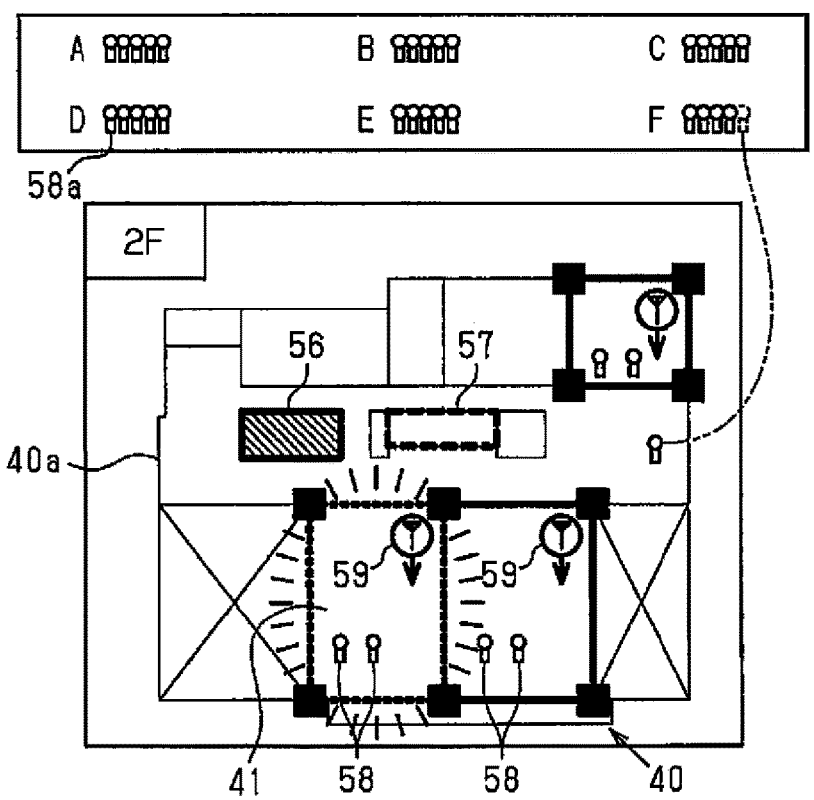
FIG. 39 shows a situation where wireless microphones are arranged at a predetermined floor.
Figure 40:
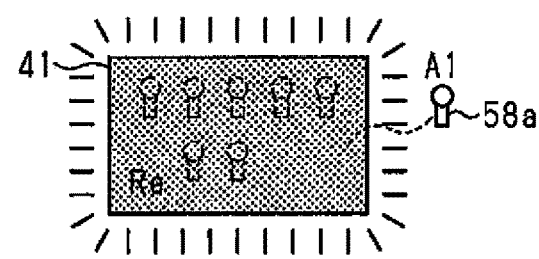
FIG. 40 shows an aspect of the display of wireless microphones.

In an example, as shown in FIG. 39, the processor 3 displays the layout 40 including the area 41 set in the layout setting processing S1 on the display device 20 and also displays microphone icons 58 corresponding to individual channels in the group of channels. In each area 41, microphone icons 58, the number of which corresponds to the desired number set in the layout setting processing S1 for each area 41, are displayed in a first display aspect. The first display aspect is shown, for example, translucently or by a broken line. For example, if the desired number is seven in the selected area 41, seven microphone icons 58 are displayed in the first display aspect (FIG. 40). The user can check the display of this first display aspect and therefore whether or not there is a wireless microphone 45 to which a channel should be assigned and the desired number for each area 41 on the screen.

In other instances, the processor 3 receives an operation of dragging (moving) a microphone icon 58 into the layout 40 as the first operation. In another example, an operation of clicking and selecting a microphone icon 58 may be received as the first operation.

(S5-1-1)

An example of the first aspect will be described.

In the first aspect, the processor 3 refers to the results of the interference determining processing S3 to derive an area 41 in which the selected channel (channel selected by the user) can be used or a channel 41 in which no channel is allowed to be used based on a rule (hereinafter referred to as "S5-1-1 rule") and notifies the user.

The S5-1-1 rule includes first and second rules.

Under the first rule, if there are areas 41 determined that no interference occurs therebetween in the results of the interference determining processing S3, the same channel is allowed to be used between the areas 41. That is, if the selected channel is assigned to only one of the areas 41 determined that no interference occurs therebetween, the selected channel is allowed to be used in the other areas 41. Under the second rule, the same channel is not allowed to be used between areas 41 determined that interference occurs therebetween in the results of the interference determining processing S3.

In response to the first operation, the processor 3 determines whether or not there is an area 41 to which the selected channel is assigned.

If the same channel as the selected channel does not exist in any one of the areas 41, the selected channel can be assigned to any of the areas 41. Accordingly, the processor 3 notifies that the selected channel can be assigned to any one of all the areas 41.

On the other hand, if there is an area 41 in which the same channel as the selected channel is set, the processor 3 notifies the user of at least one of an area 41 in which no interference can occur (determined "o" in the interference determining processing S3) and an area 41 in which interference can occur (determined "x" in the interference determining processing S3).

The processing above will be described by taking the case where the results of the interference determining processing S3 (see FIG. 28) is obtained as an example.

When the wireless microphone 45 with the channel F2 (806.875 MHz) is selected through the first operation, the processor 3 determines whether or not there is an area 41 to which the wireless microphone 45 with the channel F2 is assigned. If there is no such area 41, the channel F2 can be assigned to any one of the areas 41, and it is notified that all the areas 41 can be used.

On the other hand, if the wireless microphone 45 with the channel F2 is assigned to the area 41(Rb), at least one of the following messages is notified. That is, in accordance with the results of the interference determining processing S3 in FIG. 28, since the same channel is allowed to be assigned to the area 41(Re) in relation to the area 41(Rb), the processor 3 notifies the user that the channel F2 can be used in the area 41(Re). Alternatively, a message is provided to notify that the channel F2 is not allowed to be used in the areas 41(Ra, Rb, Rc, Rd) other than the area 41(Re).

The notification is made by, for example, a first highlighting of the area 41(Re) indicating assignability to the area 41(Re). Alternatively, the notification is made by a second highlighting of the areas 41(Ra), 41(Rb), 41(Rc), 41(Rd) indicating non-assignability to the areas 41(Ra), 41(Rb), 41(Rc), and 41(Rd).

(S5-1-2)

Another example of the first aspect will be described. In this example, the processor 3 refers to the results of the interference determining processing S3 to derive an area 41 in which the selected channel (channel selected by the user) can be used or a channel 41 in which no channel is allowed to be used based on a rule (hereinafter referred to as "S5-1-2 rule") and notifies the user.

The S5-1-2 rule includes first and second rules.

Under the first rule, the same channel is allowed to be used between areas 41 determined that no interference occurs therebetween in the results of the interference determining processing S3.

Under the second rule, the same channel and adjacent channels are not allowed to be used (i.e. multiple channels are not allowed to be used within a predetermined frequency range) between areas 41 determined that interference occurs therebetween in the results of the interference determining processing S3.

In response to the first operation, the processor 3 chooses the selected channel and channels adjacent to the selected channel. It is then determined whether or not there is an area 41 to which these channels (the same as the selected channel and the adjacent group of channels) are assigned.

If these channels (the same as the selected channel and the adjacent group of channels) are not set in any one of the areas 41, the selected channel can be assigned to any one of the areas 41. It is therefore notified that the selected channel can be assigned to any one of all the areas 41.

On the other hand, if these channels (the same as the selected channel and the adjacent group of channels) are set in any one of the areas 41, the processor 3 notifies the user of at least one of an area 41 in which no interference can occur (determined "○" in the interference determining processing S3) and an area 41 in which interference can occur (determined "x" in the interference determining processing S3).

The processing above will be described by taking the case where the results of the interference determining processing S3 (see FIG. 28) are obtained as an example.

When the wireless microphone 45 with the channel F2 (806.875 MHz) is selected through the first operation, the processor 3 determines whether or not there is an area 41 to which the channel F2 and the channels A1, C1, B2, D2, which exist within 375 KHz (excluding 375 KHz) from the channel F2, are each assigned.

If there is no area 41 to which these channels are assigned, the selected channel can be assigned to any one of the areas 41. Accordingly, it is notified that the selected channel can be assigned to any one of all the areas 41.

On the other hand, if any one of the channels F2, A1, C1, B2, and D2 is assigned to the area 41(Rb), the processor 3 notifies at least one of the following messages. That is, since the same channel is allowed to be assigned to the area 41(Re) in relation to the area 41(Rb), the processor 3 notifies the user that the channel F2 can be used in the area 41(Re). Alternatively, it is notified that the channel F2 is not allowed to be used in the areas 41(Ra), 41(Rb), 41(Rc), 41(Rd), which are determined that interference is more likely to occur in relation to the area 41(Rb) (determined "x" in FIG. 28).

The notification is made by, for example, a first highlighting of the area 41(Re) indicating assignability to the area 41(Re). Alternatively, the notification is made by a second highlighting of the areas 41(Ra), 41(Rb), 41(Rc), 41(Rd) indicating non-assignability to the areas 41(Ra), 41(Rb), 41(Rc), and 41(Rd).

FIG. 39 is an example of the display screen 21 when the manual channel determining processing S5 (S5-1) is performed.

FIG. 39 shows an example in which a wireless microphone 45 with a predetermined channel is added to a predetermined floor. Icons (additional microphone icons 58a) for addition of a new wireless microphone 45 to the area 41 are displayed in an upper part of the display screen 21. Channels are assigned to the respective additional microphone icons 58a. The additional microphone icons 58a are then displayed on the display screen 21 such that the groups are distinguished. In addition, any one of the additional microphone icons 58a can be selected and dragged (moved) into a predetermined area 41.

When one of the additional microphone icons 58a is dragged and arranged at the predetermined floor, the processor 3 searches for an area 41 in which the channel of the additional microphone icon 58a can be arranged among the multiple areas 41 based on the results of the interference determining processing S3. When such an area 41 is found through this search, the processor 3 then highlights the area 41. FIG. 39 shows a situation where the lower left area 41 at the second floor is highlighted (first highlighting). In accordance with this processing, the user can easily find an area 41 to which a wireless microphone 45 can be added on the display screen 21.

(S5-2: Second Aspect)

In the manual channel determining processing S5 according to a second aspect, the processor 3 receives a first operation (first selection operation) for selecting one or more channels from the group of channels described above and a second operation (second selection operation) for selecting an area 41 in which the channels selected through the first operation are used. During reception of the first and second operations, the processor 3 then determines whether or not the channels selected through the first operation (selected channels) can be used (assigned) within the area 41 selected through the second operation based on the results of the interference determining processing S3 according to a channel assignment rule.

Figure 41:
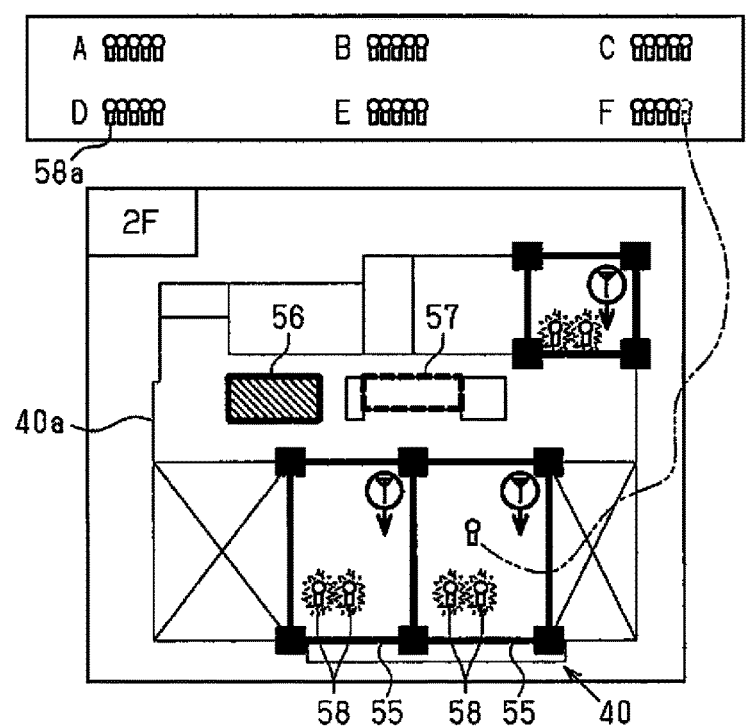
FIG. 41 shows a situation where wireless microphones are arranged in a predetermined area.

As shown in FIG. 41, the processor 3 displays the layout 40 including the area 41 set in the layout setting processing S1 on the display device 20 and also displays microphone icons 58 corresponding to individual channels in the group of channels. In each area 41, microphone icons 58, the number of which corresponds to the desired number set in the layout setting processing S1 for each area 41, is displayed in a first display aspect. The first display aspect is shown, for example, translucently or by a broken line. For example, if the desired number is seven in the selected area 41, seven microphone icons 58 are displayed in the first display aspect (FIG. 40). The user can check the display of this first display aspect and therefore whether or not there is a wireless microphone 45 to which a channel should be assigned and the desired number for each area 41 on the screen.

In an example, the processor 3 receives the first and second operations as a series of operations of, for example, dragging a microphone icon 58 into a predetermined area 41 of the layout 40 (see FIG. 41). In another example, the processor 3 is configured to receive an operation of clicking and selecting a microphone icon 58 as the first operation and an operation of clicking and selecting an area 41 as the second operation. In still another example, the processor 3 can be configured to receive an operation of clicking and selecting an area 41 and, in response thereto, display a list of the group of channels (channel list, see FIG. 30, for example) as the second operation and an operation of selecting a channel from the list as the first operation.

(S5-2-1)

An example of the second aspect will be described.

In the second aspect, the processor 3 refers to the results of the interference determining processing S3 to notify the user whether or not the selected channel (selected through the first operation by the user) is allowed to be used in the area 41 selected by the user based on a rule.

Under this rule, between the selected area 41 and the area 41 other than the selected area 41, the same channel is allowed to be used between areas 41 determined that no interference can occur therebetween, while the same channel is not allowed to be used between areas determined that interference can occur therebetween in the results of the interference determining processing S3.

In response to the first and second operations, the processor 3 determines whether or not the selected channel can be assigned to the area 41 selected through the second operation. In a certain embodiment, it is determined whether or not the selected channel is assigned to an area 41 in which interference can occur in relation to the area 41 selected through the second operation (determined "x" in the interference determining processing S3).

If the determination above is positive, that is, the selected channel is assigned to an area 41 in which interference can occur in relation to the area 41 selected through the second operation (determined "x" in the interference determining processing S3), the selected channel cannot be used and the user is notified accordingly.

If the determination above is negative, that is, the selected channel is not assigned to an area 41 in which interference can occur in relation to the area 41 selected through the second operation (determined "x" in the interference determining processing S3) and if the selected channel is not assigned to the area 41 selected through the second operation, the selected channel can be used in the area 41 selected through the second operation and the user is notified accordingly.

The notification is made in, for example, the following aspect. For example, if it is determined that the selected channel can be used, the processor 3 displays a "○" mark in a manner overlapping the corresponding microphone icon 58 on the layout 40. If it is determined that the selected channel cannot be used, the processor 3 displays a "x" mark in a manner overlapping the microphone icon 58.

If the results in FIG. 28 is obtained and if the wireless microphone 45 with the channel F2 (806.875 MHz) is selected through the first operation and the area 41(Rb) is selected through the second operation, the processor 3 operates as follows. The processor 3 determines whether or not the channel F2 is assigned to any one of the areas 41(Ra), 41(Rc), 41(Rd), which are determined that interference can occur in relation to the area 41(Rb) (determined "x" in FIG. 28).

If the channel F2 is not assigned to any one of the areas 41(Ra), 41(Rc), 41(Rd) and if the channel F2 is not also assigned to the area 41(Rb), the channel F2 can be used in the area 41(Rb) and the user is notified accordingly. On the other hand, if the channel F2 is assigned to one of the areas 41(Ra), 41(Rc), 41(Rd), the channel F2 cannot be used in the area 41(Rb) and the user is notified accordingly.

(S5-2-2)

Another example of the second aspect will be described. In this example, the processor 3 refers to the results of the interference determining processing S3 to notify the user whether or not the channel selected through the first operation is allowed to be used in the area 41 selected through the second operation based on a rule.

Under a first rule, between the selected area 41 and the area 41 other than the selected area 41, the same channel is allowed to be used between areas 41 determined that no interference occurs therebetween in the results of the interference determining processing S3. Under a second rule, between the selected area 41 and the other areas 41, the same channel and adjacent channels are not allowed to be used between areas 41 determined that interference occurs therebetween.

In response to the first and second operations, the processor 3 determines whether or not the selected channel and a group of adjacent channels can be assigned to the area 41 selected through the second operation. In a certain embodiment, it is determined whether or not the selected channel and a group of adjacent channels are assigned to an area 41 in which interference can occur in relation to the area 41 selected through the second operation (determined "x" in the interference determining processing S3).

If the determination above is positive, that is, the selected channel and adjacent channels are assigned to an area 41 in which interference can occur in relation to the area 41 selected through the second operation, the selected channel cannot be used in the area 41 selected through the second operation and the user is notified accordingly.

If the determination above is negative, that is, the selected channel and adjacent channels are not assigned to an area 41 in which interference can occur in relation to the area 41 selected through the second operation and if the selected channel is not assigned to the area 41 selected through the second operation, the selected channel can be used in the area 41 selected through the second operation and the user is notified accordingly. The aspect of the notification is the same as in 5-2-1 above.

If the results in FIG. 28 is obtained and if the wireless microphone 45 with the channel F2 (806.875 MHz) is selected through the first operation and the area 41(Rb) is selected through the second operation, it is determined whether or not any one of the channel F2 and the channels A1, C1, B2, D2, which exist within 375 KHz (excluding 375 KHz) from the channel F2, are assigned to any one of the areas 41(Ra), 41(Rc), 41(Rd) determined that interference is more likely to occur in relation to the area 41(Rb) (determined "x" in FIG. 28).

If any one of the channels F2, A1, C1, B2, D2 is not assigned to any one of the areas 41(Ra), 41(Rc), and 41(Rd) and if the channel F2 is not also assigned to the area 41(Rb), the channel F2 can be used in the area 41(Rb) and the user is notified accordingly. On the other hand, if any one of the channels F2, A1, C1, B2, D2 is assigned to any one of the areas 41(Ra), 41(Rc), 41(Rd), the channel F2 cannot be used in the area 41(Rb) and the user is notified accordingly.

FIG. 41 is an example of the display screen 21 when the manual channel determining processing S5 (S5-2) is performed.

FIG. 41 shows an example in which a wireless microphone 45 with a predetermined channel is added to a predetermined area 41. Icons (additional microphone icons 58a) for addition of a new wireless microphone 45 to the area 41 are displayed in an upper part of the display screen 21.

When one of the additional microphone icons 58a is dragged and arranged in the predetermined area 41, the processor 3 determines whether or not the channel of the additional microphone icon 58a is allowed in the area 41 based on the results of the interference determining processing S3. If the channel is not allowed, the microphone icon 58 with the channel with which interference can occur flashes. FIG. 41 shows a situation where all the microphone icons 58 in the three areas 41 at the second floor flash. In accordance with this processing, the user can determine whether or not a wireless microphone 45 can be added on the display screen 21.

As described heretofore, the channel simulation device 1 according to this embodiment exhibits the following effects.

(1) The channel simulation device 1 according to this embodiment includes a memory 2 for storing a distance calculation parameter and a reception strength calculation parameter and a processor 3. The processor 3 estimates a desired-wave reception strength and an interference-wave reception strength based on the distance calculation parameter and the reception strength calculation parameter.

In accordance with the configuration above, the desired-wave reception strength (D) and the interference-wave reception strength (U) can be obtained and thereby the strength difference therebetween can be obtained for each set of two areas 41 selected from the multiple areas 41. It is therefore possible to generate a channel plan 62 for wireless microphones 45 without relying on a skilled engineer.

(2) In this embodiment, the processor 3 performs a channel determination, for each set of two areas 41 selected from the multiple areas 41, as to whether or not interference occurs between the two areas 41 based on the difference between the desired-wave reception strength (D) and the interference-wave reception strength (U). In accordance with this configuration, it is possible to obtain information on whether or not interference occurs between the two areas 41 and therefore to generate a channel plan 62 for the wireless microphones 45 with which the wireless microphones 45 are less likely to interfere with each other while increasing the number of usable channels.

(3) In this embodiment, the processor 3 selects a channel that can be assigned to one or more areas 41 from the group of channels based on the results (channel determination) of the interference determining processing 53. In accordance with this configuration, the user can find the channel(s) that can be assigned to one or more areas 41. That is, the user can obtain a channel plan 62.

(4) In this embodiment, the processor 3 selects a channel that can be assigned to each area 41 based on the results (channel determination) of the interference determining processing S3 and a desired number (number information) for the wireless microphones 45. In accordance with this configuration, the channels that can be assigned to the multiple areas 41 are selected in view of the number of wireless microphones 45 set in the areas 41.

(5) In this embodiment, when the input device receives a selection operation for selecting one of the group of channels, the processor 3 determines whether or not the selected channel can be assigned to any one of the areas 41 based on the channel determination (see S5-1). In accordance with this configuration, the user can understand whether or not the channel that the user has selected can be assigned to any one of the multiple areas 41.

(6) In this embodiment, when the input device receives a first selection operation for selecting one of the group of channels and a second selection operation for selecting one of the multiple areas 41, the processor 3 determines whether or not the selected channel can be assigned to the selected area 41 based on the channel determination (see S5-2). In accordance with this configuration, the user can understand whether or not the channel that the user has selected can be assigned to the area 41 that the user has selected.

(7) In this embodiment, the memory 2 stores a propagation loss parameter used to derive the reception strength according to the distances between the wireless microphones 45 and the receiver 46 as the reception strength calculation parameter. In accordance with this configuration, it is possible to calculate the reception strength when the receiver 46 receives a transmission signal easily based on the reception strength calculation parameter and the distances between the wireless microphones 45 and the receiver 46.

(8) In this embodiment, the memory 2 stores an obstacle parameter indicating the attenuation amount of the signal strength of the transmission signal attenuated when the transmission signal passes through an obstacle as the reception strength calculation parameter. In accordance with this configuration, in the case of estimating the reception strength when the receiver 46 receives transmission signal from the wireless microphones 45, if there is an obstacle between the wireless microphones 45 and the receiver 46, it is possible to calculate the attenuation amount of the signal strength of the transmission signal by the obstacle easily.

(9) In this embodiment, the memory 2 stores the obstacle parameter that is set individually for each obstacle material. In accordance with this configuration, the attenuation amount of the transmission signal from the wireless microphone 45 is calculated based on the material of the obstacle. Accordingly, the attenuation amount of the transmission signal from the wireless microphone 45 is less likely to differ significantly between the calculated attenuation amount and the actual attenuation amount.

(10) In this embodiment, the processor 3 outputs a layout image 40a showing the layout 40 in the building on the display device 20 and receives an obstacle specifying operation for specifying the range or arrangement of an obstacle arranged between multiple areas 41 or within an area 41 in the output layout image 40a (see FIG. 9). The processor 3 also stores an obstacle arrangement parameter indicating the range or arrangement of the obstacle based on the range or arrangement specified by the obstacle specifying operation in the memory 2. In accordance with this configuration, since the obstacle arrangement parameter is derived based on an operation on the layout image 40*a* of the building, the user can set the obstacle arrangement parameter easily.

(11) In this embodiment, the processor 3 outputs a layout image 40*a* showing the layout 40 of the building, receives a specifying operation for specifying the range or arrangement of the multiple areas 41 within the output image (see FIG. 8), and stores the distance calculation parameter based on the range or arrangement specified by the specifying operation in the memory 2. In accordance with this configuration, since the distance calculation parameter is derived based on an operation on the layout image 40*a* of the building, the user can set the distance calculation parameter easily.

It will be apparent to those skilled in the art from the present disclosure that in (10) and (11) above, specifying the range of multiple areas 41 indicates, for example, setting the range of the areas 41 by moving or stretching the area frames 55 displayed on the layout image 40*a* of the floor through the first input device 31 (see FIG. 8). In contrast, specifying the arrangement of multiple areas 41 indicates, for example, determining the arrangement of the areas 41 by specifying an arbitrary area region from any of multiple area regions preset on the layout image 40*a* of the floor.

(12) In this embodiment, when estimating the desired-wave reception strength, the processor 3 estimates the reception strength when a transmission signal transmitted from the wireless microphone 45 in one area 41 is received by the receiver 46 for each of multiple arrangement points PD at which the receiver 46 is expected to be installed within the one area 41. The processor 3 then uses one selected from the multiple estimated reception strengths according to a rule as the desired-wave reception strength. When estimating the interference-wave reception strength, the processor 3 estimates the reception strength when a transmission signal transmitted from the wireless microphone 45 in other area 41 is received by the receiver 46 for each of multiple arrangement points PD at which the receiver 46 is expected to be installed within the one area 41. The processor 3 then uses one selected from the multiple estimated reception strengths according to a rule as the interference-wave reception strength.

The desired-wave reception strength and the interference-wave reception strength can be estimated with the areas 41 regarded as points in a space. In this case, the desired-wave reception strength is set to a constant, while the interference-wave reception strength is calculated based on the distance between two points. In accordance with this calculation, the ratio between the desired-wave reception strength and the interference-wave reception strength is determined accordingly only to the arrangement relationship between the areas 41 regardless of the size of the areas 41. However, since the larger the areas 41, the greater the maximum distance between the wireless microphones 45 and the receiver 46 becomes in practice, the range (from minimum value to maximum value) of the desired-wave reception strength and the range (from minimum value to maximum value) of the interference-wave reception strength also increase.

In the configuration above, one of the multiple reception strengths estimated within an area 41 is selected as the desired-wave reception strength. One of the multiple reception strengths estimated between areas 41 is selected as the interference-wave reception strength. The desired-wave reception strength and the interference-wave reception strength are thus selected from some candidates according to a predetermined rule. Optimizing the predetermined rule can allow the desired-wave reception strength and the interference-wave reception strength to be adjusted to approach an actual value.

(13) In this embodiment, when estimating the desired-wave reception strength, the processor 3 estimates the reception strength when a transmission signal transmitted from the wireless microphone 45 in one area 41 is received by the receiver 46 for each of multiple arrangement points PD at which the wireless microphones 45 are expected to be used in the one area 41. The processor 3 then uses one selected from the multiple estimated reception strengths according to a rule as the desired-wave reception strength. When estimating the interference-wave reception strength, the processor 3 estimates the reception strength when a transmission signal transmitted from the wireless microphone 45 in the other area 41 is received by the receiver 46 for each of multiple arrangement points PD at which the wireless microphones 45 are expected to be used in the one area 41. The processor 3 then uses one selected from the multiple estimated reception strengths according to a rule as the interference-wave reception strength. With this configuration, for the same reason as in (12) above, optimizing the predetermined rule can allow the desired-wave reception strength and the interference-wave reception strength to be adjusted to approach an actual value.

(14) In this embodiment, when estimating the desired-wave reception strength, the processor 3 estimates the reception strength for all sets of multiple arrangement points PD of the wireless microphones 45 and multiple arrangement points PD of the receiver 46 in one area 41. The processor 3 then uses one selected from the multiple estimated reception strengths according to a rule (e.g. the minimum reception strength) as the desired-wave reception strength in the one area 41. When estimating the interference-wave reception strength, the processor 3 estimates the reception strength for all sets of multiple arrangement points PD of the receiver 46 in one area 41 and multiple arrangement points PD of the wireless microphones 45 in the other area 41. The processor 3 then uses one selected from the multiple estimated reception strengths according to a rule (e.g. the maximum reception strength) as the interference-wave reception strength in the one area 41. With this configuration, for the same reason as in (12) above, optimizing the predetermined rule can allow the desired-wave reception strength and the interference-wave reception strength to be adjusted to approach an actual value.

(15) The function of the channel simulation device 1 can be achieved by a program. For example, the channel simulation program includes a computer-readable instruction that causes a computer to perform a first processing and a second processing. In the first processing, the computer reads the distance calculation parameter and the reception strength calculation parameter out of the memory 2. In the second processing, the computer estimates the desired-wave reception strength and the interference-wave reception strength based on the distance calculation parameter and the reception strength calculation parameter.

In accordance with the channel simulation program above, the desired-wave reception strength and the interference-wave reception strength can be obtained and thereby the strength difference therebetween can be obtained for each set of two areas 41 selected from the multiple areas 41. It is therefore possible, by using the channel simulation program, to generate a channel plan 62 for wireless microphones 45 without relying on a skilled engineer.

Other Embodiments

While in this embodiment, assignment of channels to the wireless microphones 45 in each area 41 is made in ascending order of frequency, channels may be assigned in the order of the groups and in ascending order of channel frequency in each group.

While in this embodiment, it is assumed that there is a concrete floor wall 42 between floors, the channel simulation device 1 may be arranged such that the material of the floor wall 42 can be set by the user.

While in this embodiment, the receiver 46 and the wireless microphones 45 are arranged at 27 arrangement points PD to calculate the desired-wave reception strength and the interference-wave reception strength, the setting of the arrangement points PD is not limited thereto. For example, the number of the arrangement points PD may be further increased. Alternatively, in order to shorten the time required for simulation, only two arrangement points PD may be provided in each area 41 and the receiver 46 may be arranged at one of the points, while the wireless microphone 45 may be arranged at the other point to calculate the desired-wave reception strength and the interference-wave reception strength.

While in this embodiment, the receiver 46 and the wireless microphones 45 are arranged at 27 arrangement points PD regardless of the size of each area 41 to calculate the desired-wave reception strength and the interference-wave reception strength, the number of the arrangement points PD may be increased or decreased depending on the size of each area 41.

The memory 2 may store the layout 40 and the areas 41 as one or more two-dimensional maps, that is, two-dimensional floors, though preferably as one or more three-dimensional maps, that is, three-dimensional floors. The memory 2 may be a volatile memory, though preferably a non-volatile memory. The memory 2 may be a digital storage device such as an optical disk, a magnetic disk, a magnetooptical disk, or a hard disk drive, though preferably a semiconductor storage device.

Reference to a program herein may include one or more pieces of software, one or more applications, one or more computer-readable instructions, and/or one or more computer-readable codes. A program herein may be stored in one or more computer-readable storage media. In some embodiments, the computer-readable storage media may be memories 2 accessible by the processor 3, digital storage devices accessible by the processor 3, internal registers or caches of the processor 3, or a combination thereof.

It will be apparent to those skilled in the art that the present invention may be embodied in other specific forms without departing from the technical concept of the invention. For example, the components and elements described in the embodiments above (or one or more aspects thereof) may be partly omitted and/or combined.

DESCRIPTION OF REFERENCE SIGNS

1 . . . channel simulation device, 2 . . . memory, 3 . . . processor, 4 . . . output interface (I/O), 5 . . . first input interface, 6 . . . second input interface, 7 . . . third input interface, 8 . . . display device with a touchscreen, 9 . . . case, 20 . . . display device, 21 . . . display screen, 31 . . . first input device, 32 . . . second input device, 33 . . . third input device, 34 . . . communication network, 40 . . . layout, 40a . . . layout image, 41 . . . area, 41x . . . calculation target area, 41y . . . area, 41A . . . area, 41B . . . area, 41AM . . . estimated use range, 41BM . . . estimated use range, 41M . . . estimated use range, 41AR . . . estimated installation range, 41BR . . . estimated installation range, 41R . . . estimated installation range, 42 . . . floor wall, 43 . . . partition wall, 44 . . . void, 45 . . . wireless microphone, 46 . . . receiver, 50 . . . scaler, 51 . . . first input frame, 52 . . . second input frame, 53 . . . first positioning pointer, 54 . . . second positioning pointer, 55 . . . area frame, 56 . . . partition wall frame, 57 . . . void frame, 58 . . . microphone icon, 58a . . . additional microphone icon, 59 . . . receiver icon, 60 . . . arrow icon, 61 . . . channel table, 62 . . . channel plan, 555 . . . anchor, 556 . . . area frame, 655 . . . anchor, 656 . . . area frame, LA . . . offset distance, PD . . . arrangement point.

The invention claimed is:

1. A channel simulation device comprising:
a memory configured to store at least one distance calculation parameter for calculating distances between multiple wireless microphones and a receiver in multiple areas in which the multiple wireless microphones and the receiver are used, and at least one reception strength calculation parameter for estimating reception strengths when transmission signals transmitted from the wireless microphones are received by the receiver; and
a processor configured to estimate, for each set of two areas selected from the multiple areas, a desired-wave reception strength when a transmission signal transmitted from a wireless microphone in one area of the two areas is received by the receiver in the one area and an interference-wave reception strength when a transmission signal transmitted from a wireless microphone in the other area of the two areas is received by the receiver in the one area, based on the distance calculation parameter and the reception strength calculation parameter.

2. The channel simulation device according to claim 1, wherein the processor is configured to perform a channel determination, for each set of two areas selected from the multiple areas, as to whether or not interference occurs between the two areas based on the difference between the desired-wave reception strength and the interference-wave reception strength.

3. The channel simulation device according to claim 2, wherein the memory is configured to store a group of channels set at a predetermined frequency interval, and wherein the processor is configured to select one or more channels that can be assigned to one or more areas from the group of channels based on the channel determination.

4. The channel simulation device according to claim 2, further comprising an input device through which a user input operation is received,
wherein the memory is configured to store a group of channels set at a predetermined frequency interval and number information which is input through an input operation received at the input device and indicates the number of wireless microphones set in each of the multiple areas, and
wherein the processor is configured to select one or more channels that can be assigned to the areas based on the channel determination and the number information.

5. The channel simulation device according to claim 2, further comprising an input device through which a user input operation is received,
wherein the memory is configured to store a group of channels set at a predetermined frequency interval, and
wherein the processor is configured to, when the input device receives a selection operation for selecting a channel from the group of channels, determine whether or not the selected channel can be assigned to any one of the areas based on the channel determination.

6. The channel simulation device according to claim 2, further comprising an input device through which a user input operation is received,
- wherein the memory is configured to store a group of channels set at a predetermined frequency interval, and
- wherein the processor is configured to, when the input device receives a first selection operation for selecting a channel from the group of channels and a second selection operation for selecting an area from the multiple areas, determine whether or not the selected channel can be assigned to the selected area based on the channel determination.

7. The channel simulation device according to claim 1, wherein the memory is configured to store, as the reception strength calculation parameter, a propagation loss parameter for deriving reception strength according to the distance between the wireless microphone and the receiver.

8. The channel simulation device according to claim 1, wherein the memory is configured to store, as the reception strength calculation parameter, an obstacle parameter indicating attenuation amount of the signal strength of the transmission signal to be attenuated when the transmission signal passes through an obstacle.

9. The channel simulation device according to claim 8, wherein the memory is configured to store the obstacle parameter that is set individually for each obstacle material.

10. The channel simulation device according to claim 1, further comprising an input device through which a user input operation is received,
- wherein the processor is configured to output a layout image showing the layout of a building on a display device, receive an obstacle specifying operation for specifying the range or arrangement of obstacles arranged between multiple areas or within an area in the output layout image, and store an obstacle arrangement parameter indicating the range or arrangement of the obstacles based on the range or arrangement specified by the obstacle specifying operation as the reception strength calculation parameter in the memory.

11. The channel simulation device according to claim 1, further comprising an input device through which a user input operation is received,
- wherein the processor is configured to output a layout image showing the layout of a building, receive a specifying operation for specifying the range or arrangement of the multiple areas within the output image, and store the distance calculation parameter based on the range or arrangement specified by the specifying operation in the memory.

12. The channel simulation device according to claim 1, wherein the processor is configured to:
- when estimating the desired-wave reception strength, estimate the reception strength when a transmission signal transmitted from the wireless microphone in the one area is received by the receiver for each of multiple arrangement points at which the receiver is expected to be installed in the one area, use one selected from the multiple estimated reception strengths according to a rule as the desired-wave reception strength, and
- when estimating the interference-wave reception strength, estimate the reception strength when a transmission signal transmitted from the wireless microphone in the other area is received by the receiver for each of multiple arrangement points at which the receiver is expected to be installed in the one area, and use one selected from the multiple estimated reception strengths according to a rule as the interference-wave reception strength.

13. The channel simulation device according to claim 1, wherein the processor is configured to:
- when estimating the desired-wave reception strength, estimate the reception strength when a transmission signal transmitted from the wireless microphone in the one area is received by the receiver for each of multiple arrangement points at which the wireless microphones are expected to be used in the one area, use one selected from the multiple estimated reception strengths according to a rule as the desired-wave reception strength, and
- when estimating the interference-wave reception strength, estimate the reception strength when a transmission signal transmitted from the wireless microphone in the other area is received by the receiver for each of multiple arrangement points at which the wireless microphones are expected to be used in the one area, and use one selected from the multiple estimated reception strengths according to a rule as the interference-wave reception strength.

14. A non-transitory computer-readable storage media having computer executable instructions stored thereon that, when executed by a computer, cause the computer to perform:
- a first processing for reading out of a memory at least one distance calculation parameter for calculating the distances between multiple wireless microphones and a receiver in multiple areas in which the multiple wireless microphones and the receiver are used and at least one reception strength calculation parameter for estimating reception strengths when transmission signals transmitted from the wireless microphones are received by the receiver, and
- a second processing for estimating, for each set of two areas selected from the multiple areas, a desired-wave reception strength when a transmission signal transmitted from a wireless microphone in one area of the two areas is received by the receiver in the one area and an interference-wave reception strength when a transmission signal transmitted from a wireless microphone in the other area is received by the receiver in the one area, based on the distance calculation parameter and the reception strength calculation parameter.

* * * * *